United States Patent [19]
Schliekelmann et al.

[11] Patent Number: 6,100,994
[45] Date of Patent: Aug. 8, 2000

[54] REPRODUCTION DEVICE FOR COPYING, SCANNING OR PRINTING IMAGE INFORMATION AND PROVIDED WITH AN IMPROVED USER INTERFACE

[75] Inventors: Leo H. R. N. Schliekelmann; Antonia P. Kwak, both of Eindhoven; Jan H. Geels, Den Bosch; Antonius H. L. Boots, Maasbree; Monique G. M. Sommer, Eindhoven; Hermina R. Rutgers, Ede, all of Netherlands

[73] Assignee: Oce Technologies, B.V., Ma Venlo, Netherlands

[21] Appl. No.: 09/023,870

[22] Filed: Feb. 13, 1998

[30] Foreign Application Priority Data

Feb. 14, 1997 [NL] Netherlands ............................ 1005272

[51] Int. Cl.[7] ...................................................... G06F 15/00
[52] U.S. Cl. ........................ 358/1.15; 358/1.13; 358/1.18
[58] Field of Search ................................. 358/1.15, 1.18, 358/1.13, 1.1, 1.6, 1.2, 1.9, 1.12, 1.14, 401, 442, 452, 501, 434, 453, 468; 345/326, 332, 333, 335, 340, 348, 352, 353, 354, 146, 173; 399/38

[56] References Cited

U.S. PATENT DOCUMENTS

| | | | |
|---|---|---|---|
| 5,079,723 | 1/1992 | Herceg et al. | 345/352 |
| 5,119,079 | 6/1992 | Hube et al. | 345/146 |
| 5,133,048 | 7/1992 | Parsons et al. | 358/1.15 |
| 5,452,057 | 9/1995 | Imaizumi et al. | 399/38 |
| 5,838,883 | 11/1998 | Pekelman | 358/1.15 |

FOREIGN PATENT DOCUMENTS

| | | |
|---|---|---|
| 0521127B1 | 1/1982 | European Pat. Off. . |
| 0624969A1 | 5/1994 | European Pat. Off. . |
| 0702273A2 | 9/1995 | European Pat. Off. . |

*Primary Examiner*—Dov Popovici
*Attorney, Agent, or Firm*—Birch, Stewart, Kolasch & Birch, LLP

[57] ABSTRACT

A reproduction device includes a scanner, memory for storage of electrical image information, a printer and an operating device. The operating device comprises a display screen for the display of apparatus functions for selection, a first selection device for selecting a group of apparatus functions to be displayed on the display screen, and a second selection device for selecting the displayed apparatus functions or options thereof. The apparatus functions are grouped in a first group of apparatus functions relating to all the document sheets of a document for scanning, copying or printing, a second group relating to a specific document sheet of a document and a third group relating to a specific area of a specific document sheet. The first selection device is suitable for selecting directly from a standard basic menu at least some of the functions from one of the groups of functions.

20 Claims, 29 Drawing Sheets

REPRODUCTION DEVICE FOR COPYING, SCANNING OR PRINTING IMAGE INFORMATION AND PROVIDED WITH AN IMPROVED USER INTERFACE

FIELD OF THE INVENTION

The invention relates to a reproduction device with scanner means, memory means for storage of electrical image information, printing means and operating means. The operating means includes a display screen which can show a standard menu and at least some of the selectable functions of either a first, second or third group of apparatus functions.

DESCRIPTION OF THE BACKGROUND ART

European patent EP 0 521 127 describes a similar copying device provided with an image screen and a control panel. The apparatus function displayed on the screen and to be carried out is selected in this case by operating knobs on the control panel. Owing to the large number of apparatus functions it is not possible to display them all simultaneously on the screen. In the first instance the screen displays as a standard setting a limited number of selectable standard apparatus functions. The other more special apparatus functions are displayed in a new display called up by means of the knobs on the control panel.

In addition to the standard basic screen with only general standard apparatus functions therein, it is possible to select a screen with apparatus functions for orders for a document of different pages. This is indicated as being a job. In this case the apparatus functions to be selected either apply to all the pages forming a document and/or relate to the specific apparatus functions for a document of various pages, such as sorting, stapling and the like. Instead of the standard screen and the screen for jobs, it is also possible to select a screen with apparatus functions relating to a specific page. The apparatus functions relating to a specific page are to be found on that screen.

A disadvantage of the above-described construction is the extra operations necessitated by such a division of apparatus functions. From the basic screen it is first necessary to actuate a key for special apparatus functions, after which a screen for jobs appears to the user. A key then has to be actuated to go to the screen for pages. If it is then required to display apparatus functions for part of a page, then again a key must be actuated from the screen for pages in order to call up such a screen.

Another disadvantage of such a construction is that in the first instance it is concealed from the user that there are many more apparatus functions than shown in the standard screen. The presence of the special functions for a job or page and particularly the functions relating to part of a page does not appear immediately from the standard screen.

U.S. Pat. No. 5,079,723 describes a copying machine in which the operation comprises a display screen with which, inter alia, selections can be made by touching areas on the screen. The selectable apparatus functions are displayed by means of corresponding icons which are in turn distributed over various windows similar to tab cards. These windows are displayed in partially overlapping form, and if a label or tab of a window is touched, it appears in its entirety in the foreground. The primary windows selectable are a standard window for standard documents, a window for fan fold documents and a window for oversized documents. Inside the primary main window for standard documents there are in turn a number of successive secondary windows with corresponding tabs. The secondary windows are divided up into a window for programming standard apparatus functions and a window for apparatus functions relating to a page. A number of icons relating to original processing, copy processing, copy quality and finishing are displayed in part of the secondary window for programming standard apparatus functions. Touching one of these icons shows a number of apparatus functions corresponding to that icon in the other part of the secondary card.

The secondary window for programming apparatus functions relating to a page comprises icons for insertion of a special page, indicating the start of a chapter in a document and setting the copy quality for a specific page.

In addition, the display screen comprises not only the primary window but also icons for setting the program mode either for the current document or for future documents.

Although a user now does have an impression of the number of groups in which apparatus functions are accommodated, from the constantly visible tabs of the overlaid windows, the division of apparatus functions on the other hand is still limited to the secondary window with standard apparatus functions and the secondary window with apparatus functions relating to specific pages. There are, however, no specific windows present with special apparatus functions for documents. A typical apparatus function for documents, namely finishing, is contained, for example, in the window with standard apparatus functions.

U.S. Pat. No. 5,119,079 describes a copying machine provided with a display screen with windows similar to tab cards and selectable by touch. On the display screen it is possible to select the following from three modes each displayed by a primary window: a job programming mode with a window for standard apparatus functions relating to a job, a page programming mode with a window for apparatus functions for all the pages of a job and a cover programming mode with a window for apparatus functions relating to covers. The apparatus functions for an area or a specific page are accommodated in a sub-program mode which can also be selected from one of the programming modes. Examples are a cut and paste sub-programming mode or an open job sub-mode with apparatus functions such as inserting a specific page.

SUMMARY OF THE INVENTION

On the other hand, the apparatus according to the invention is intended to obviate the above disadvantages and to this end it is characterized in that the first selection means are suitable for selecting, from a standard menu displayed on the display screen, by means of respectively document, page or area selection signals, the display on the display screen of at least some of the selectable functions of either the first, second or third group of apparatus functions.

It is now immediately clear to the user, without performing any action, that he or she can make settings or select functions relating to either all the document sheets of a document, a document sheet itself or an area of a document. In particular, the option for functions and settings relating to an area of a document sheet is no longer concealed in a sub-menu which is not yet displayed. From a standard and default main menu the user can now immediately select display of selectable functions and settings at area level.

A user who, in particular, makes occasional use of such a reproduction device will find this an advantage.

In another advantageous embodiment, according to the invention, the operating means comprise signalling means for indicating whether the first, second or third group of apparatus functions has or has not been selected by the document, page and area selection signals.

As a result, the level and for what he or she is selecting functions or making settings will always be clear to the user. This is particularly advantageous in the case of those settings which can be carried out at document, page, or area level, e.g. settings such as enlargement/reduction, brightness, contrast or position of an image to be printed on a document sheet. Depending on the selection of the level, these settings apply either to all the document sheets of a document, or to a document sheet, or to an area of a document sheet.

In another advantageous embodiment according to the invention, the first selection means are suitable for selecting, from a standard screen displayed on the display screen, by means of respectively basic, printing quality and speciality selection signals, the display on the display screen of at least some of the selectable apparatus functions relating respectively to basic functions, print quality functions and special functions.

By selectively offering the functions at a selected level when a level is specifically selected, e.g. document, page or area level, to which the functions relate, the overview for the user is increased. In this case the basic functions relate to the minimum functions required to be selected for an operation, e.g. indicating scanning and/or making single or double-sided prints. The copy quality functions relate to settings which can be changed if the standard settings yield an inadequate copy quality, e.g. the contrast setting.

The user's overview is further increased if the operating means comprise signalling means for indicating whether either the basic, print quality or speciality functions have or have not been selected by the basic, print quality and speciality selection signals.

By also displaying the category of functions selected at a particular level in combination with the signalling means for the selected level to which the functions displayed relate, the user continues to have an overview.

A first embodiment is further characterized in that the first selection means are suitable for selecting from a standard screen displayed on the display screen, by means of respectively copying, scanner and print selection signals, the display on the display screen of apparatus functions relating to respectively copying, scanning or printing. The hybrid character of the reproduction device to be operated is thus made clear to the user.

A second embodiment is characterized in that the first selection means are suitable for selecting from a standard screen displayed on the display screen, by means of respectively new-job or existing-job selection signals, the display on the display screen of apparatus functions relating respectively to defining or changing a new or existing copying, scanning or printing job respectively. Instead of confronting the user with the hybrid character of the reproduction device as in the first embodiment, in the second embodiment the user is first asked whether he wishes to select functions or make settings for image information already stored or wishes to do it for new image information which, for example, is still to be scanned. In this case an job is accordingly considered as set of selected functions and settings made for a document already stored or still to be scanned.

Finally, a practical embodiment of the reproduction device is characterized in that the first selection means are constructed in the form of keys disposed near the display screen, the signalling means are each constructed as a separately controllable signalling area displayed on the display screen and corresponding to a key, the area being suitable for indicating whether a selection corresponding to the signalling area has or has not been selected by the corresponding key. Keys of this kind, which are also termed soft keys, are preferable for the user interface described.

These and other objects of the present invention are fulfilled by scanner means for photoelectrically converting the image information of a document sheet to electrical image information, memory means for storing electrical image information, printer means for printing electrical image information on a document sheet, control means for controlling the reproduction device by means of control signals, user interface means for generating operating signals to be fed to the control means, the user interface means comprising: a display screen for displaying groups of apparatus functions for selection, first selection means for selecting a group of apparatus functions to be displayed on the display screen, by generating first operating signals to be fed to the control means, second selection means for selecting an apparatus function displayed on the display screen and for generating second operating signals corresponding thereto and for feeding to the control means, wherein the groups of apparatus functions comprise a first group with document apparatus functions relating to all the document sheets of a document, a second group with document sheet apparatus functions relating to a specific document sheet and a third group with document area apparatus functions relating to a specific area of a specific document sheet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
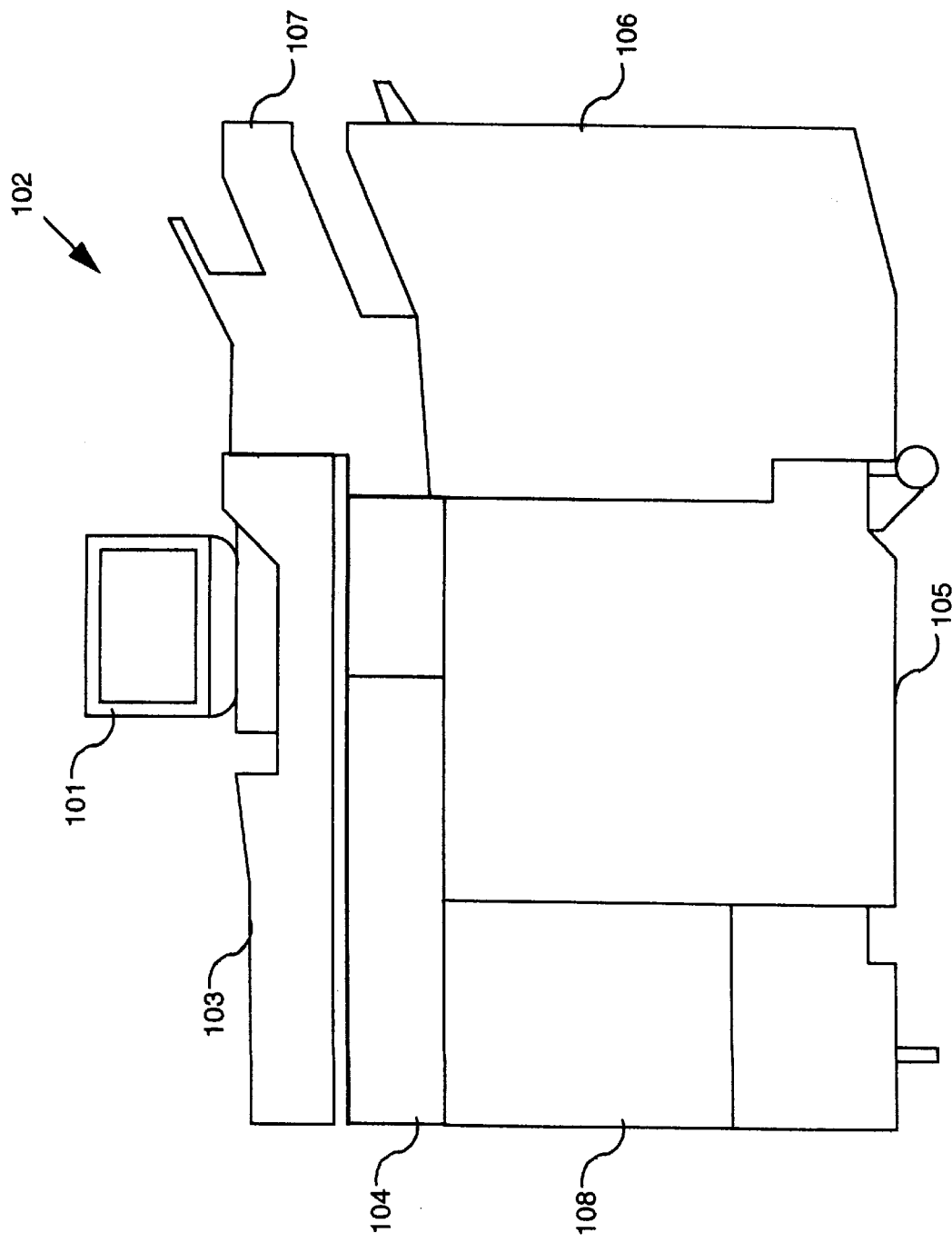
FIG. 1 is a diagram of a reproduction apparatus with a display screen for selectable apparatus functions.

FIG. 1 diagrammatically illustrates the lay-out of operating means 101 for displaying selectable apparatus functions of a reproduction device 102. The latter is provided with an automatic page feeder 103 for automatically feeding to scanner means 104 an original sheet or stack of original sheets placed in the feeder. The scanner means 104 optically scan an original sheet fed thereto and convert the optical information into electrical image signals by means of photoelectric sensors such as a CCD. The reproduction device 102 also comprises an image-forming module 105 for printing electrical image signals on an image support, such as a sheet of paper. The image formation can be effected in various ways. For example, it can be produced electrophotographically by means of a photoconductor, laser or LED exposure or, for example, ink jet. Moreover, the image formation need not be restricted to one color, but may also comprise back-up color or even full color. The reproduction device is also provided with a magazine 106 for paper sheets for printing and a processing module 107 for processing and depositing the printed paper sheets. The reproduction device 102 is also provided with an image processing module 108, in which, inter alia, an electronic memory is provided to store electrical image signals.

Figure 2:
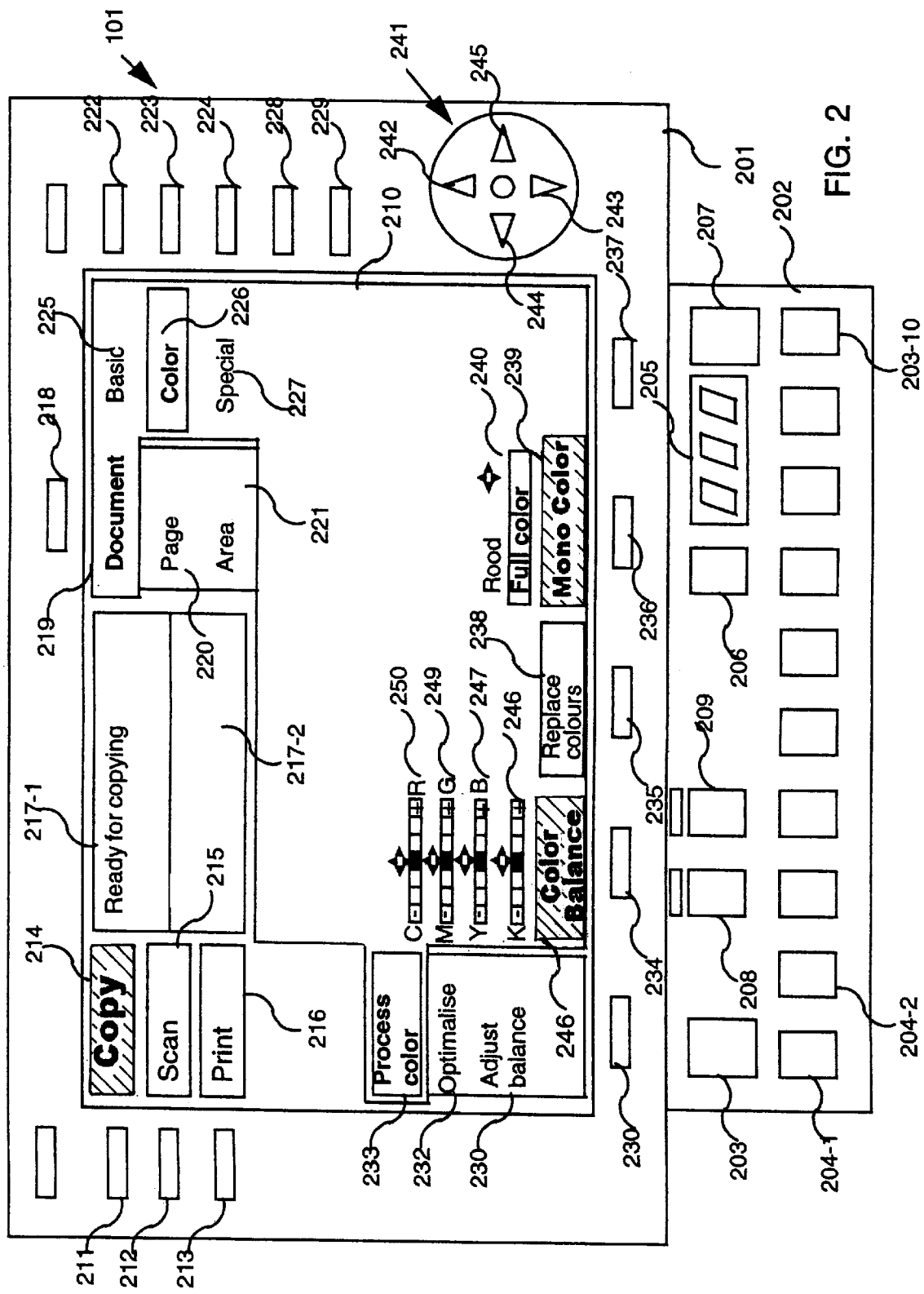
FIG. 2 is a detail of the display screen of FIG. 1 with associated keys according to a first embodiment of the invention.

FIG. 2 is a more detailed illustration of the operating means 101 of FIG. 1. The operating means 101 comprise a display panel 201 and an operating panel 202. The latter comprises the conventional keys for a reproduction device. The start key 203 is for starting a job to be executed by the reproduction device, e.g. the copying of an original sheet or sheets fed to the page feeder 103. The start key 203 is also intended for confirming the settings made. The number of prints of an original sheet can be set by the number keys 204 and be displayed with a display 205. A stop key 206 is also provided to interrupt any print operation. If the stop key 206 is pressed once, printing is interrupted at a set limit while if it is pressed twice it is stopped at a page limit. A correction key 207 interrupts scanning during printing in the event that scanning is carried out. If pressed twice, the number of copies set can be corrected and if pressed three times the adjustments can be corrected. If scanning is not carried out, the settings can immediately be corrected if the correction key 207 is pressed once. An interrupt key 208 is used for temporarily interrupting an instantaneous job for a job to be executed in between. Finally, there is a set collation key 209 for activating a mode in which, after scanning, original sheets are stored solely as a set of originals and not printed. The set collation mode is terminated by again pressing the set collation key 209.

The display panel 201 comprises a display screen 210 of the LCD-color type which can simultaneously display 256 different colors. The size is comparable to an A5-sheet format. The screen filling can be defined to pixel level.

Around the display screen 210 there are disposed a number of keys which can be functionally coupled to a specific area on the display screen 210. Pressing the key 211 sets the reproduction device to a copying mode, in which it functions as a copying machine, in which original sheets supplied are scanned and then printed. The area 214 corresponding to the key 211 indicates, for example by increased contrast of the text displayed in the area 214, that this mode has been activated. The key 212 puts the reproduction device in the scanning mode, indicated by area 215, in which it functions as a scanner. As a scanner, original sheets supplied are scanned and the electrical image information obtained therefrom is finally stored on its own on an internal or external image memory. Finally, key 213 puts the reproduction device in a printing mode, indicated by area 216, in which the reproduction device functions as a printer suitable for printing electrical image information either stored in the reproduction device or fed therefrom from an external source. Depending on the mode selected, only the operating functions and settings relevant to the selected mode are displayed on the display screen 210. The operating functions and settings involved will be explained with reference to the following Figures.

The areas 217-1 and 217-2 are used for displaying machine messages, messages in respect of the scanner part being displayed in the area 217-1 and messages regarding the printing part displayed in the area 217-2.

The key 218 is for selecting the level on which settings and functions can be defined. A distinction is made between three levels: a document level, a page level and an area level. The term "area" refers to part of a specific page of a document of different pages. only one level can be selected at any time. The selection of a level is displayed by increased contrast of one of the corresponding areas 219, 220 and 221. Selection is effected by successive pressing of the key 218.

Just as is the case with the selected mode, only operating functions and settings relevant to the selected level are displayed on the display screen 210. Examples are finishing options such as stapling when the document level is selected, and the insertion of a page when the page level is selected. What is important here is that the selection of the level always remains visible on the display screen 210, so that the user always knows the level at which he is inputting settings. This prevents the user from losing sight of the mode. It must be remembered that identical functions can occur on each level. For example, the setting for brightness or contrast can be effected at all levels. If it is carried out at the document level, then the setting applies to all the pages of the document. However, at the page and area levels the setting applies only to the specific page or specific area of a specific page. It is also important that the selected level is adapted to be changed at all times, irrespective of the functions and function detailing shown on the screen.

The functions to be set or settings to be selected for each mode, such as copying, scanning or printing, and for each level, such as document, page or area level, are further divided into groups of functions and settings. Here a distinction is made between a group of functions and settings which can be regarded as conventional standard functions or settings for the selected mode and the selected level. This group, which is referred to as the basic group, is selected with the key 222, selection being displayed at area 225. A second group relates to settings for copy quality and can be selected by key 223 with the corresponding area 226. Since the reproduction device is suitable for scanning and printing in color, this group is referred to as the color group. All the other settings are arranged in a third group, designated the special group. Key 224 and area 227 correspond to this.

The groups can be further extended optionally, the keys 228 and 229 still being usable. The selection of a group of functions and settings are further displayed, for example, by increased contrast or other different display of the area involved. In this connection it is important that the areas for indicating selection of the non-selected groups of functions, and the non-selected levels and modes, should be displayed, even though less conspicuously, on the screen 210. The user must in fact always have an overview of the mode, level, and groups in which he or she is selecting functions and settings.

Finally, key 230 enables a division in sub-groups of a selected group of functions and settings. In the example shown in FIG. 2, in which copying is selected as the mode, document as the level and color as the group, the sub-groups of balance control, optimization and color processing can be selected. In this case the areas 231, 232 and 233 are respectively used to indicate the selection. Here again the selected and non-selected sub-groups are displayed at all times on the screen 210.

The specific functions or settings corresponding to a selection thus chosen are finally displayed in the remaining part of the screen 210. These are selectable with the keys 234 to 237. If there are no sub-groups, then key 230 is also available for this. Selection may consist of activating or de-activating a function as with the key 235 and a corresponding area 238 is displayed. A selection can also comprise selecting the monocolor option setting selectable with the key 236, and by full color or red printing options respectively displayed by areas 239 and 240. If the red printing option is selected 240, the key cluster 241 can also be used to select from a list of different colors for printing. This key cluster comprises a set of keys 242 to 245 which are pressed independently of one another and are indicated in the form of arrowheads. The vertically oriented keys 242 and 243 are used to scroll through an imaginary vertical list of selectable colors in the area 240. The horizontal keys 244 and 245 are used, for example in the case of selection of the color balance function, displayed by area 246, by actuation of the key 234, to control the amount of print color to be used. By means of the key 234 it is possible to select four possible colors displayed by the areas 247 to 250, by successively pressing the key 234.

Although the embodiment described advantageously makes use of physical keys for selection of functions and adjusting settings, it is also possible to use, for example, a touch screen, in which the areas displayed on the screen themselves serve as keys. Also, the selections can be carried out by known indicating means in the form of a digital pen, a roller ball or a mouse.

Operation will be further explained with reference to the following Figures, the terms "functions" and "settings" being used throughout to indicate functions (such as stapling) which are to be performed, and also settings required (such as brightness).

Figure 3:
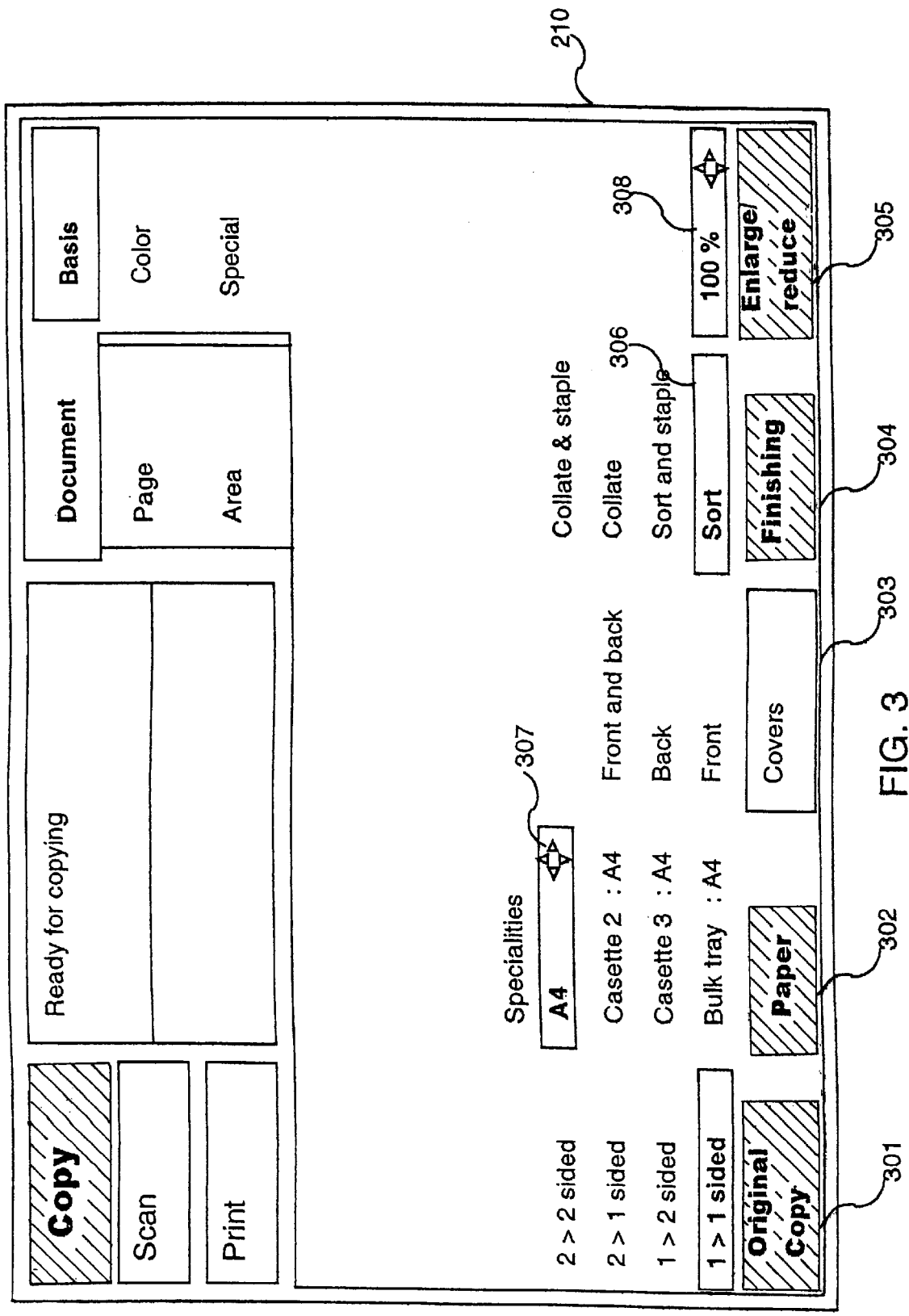
FIG. 3 shows the standard start-up screen with standard apparatus functions for all the pages of a document for copying.

FIG. 3 is an example of the display screen 210 as displayed when the copying mode, document level and basic functions group are selected. The relevant functions concern indicating respectively whether the original and copy are single-sided or double-sided (original>copy 301); the choice of paper format to be used (paper 302); whether or not covers are to be added and if so, where (covers 303), processing of the copies (processing 304); and changing the sizes (enlarge/reduce 305). The selections are made by means of the keys 230 to 237 shown under the areas in FIG. 2, in the manner described. The selection of an option such as the sorting option under the processing function 304 is indicated by framing the corresponding area 306. In the case of the option A4 307 of the paper function 302 and the 100% option of the enlarge/reduce function 305, a different value can be selected by means of the key cluster 241 shown in FIG. 2. For example, by selecting A3 or A5 as paper format instead of A4, or 141% as the enlargement factor. The adjustable option 307 displays as standard the paper format present in a first cassette tray. With this option 307, however, it is possible to select another paper format not yet situated in the first cassette tray. When the job is performed the user, by means of a message on the screen, will be asked to place the correct format in the first cassette tray. It should also be noted that with the selection displayed in FIG. 3 there is no further division of the functions into sub-groups of functions.

Figure 4:
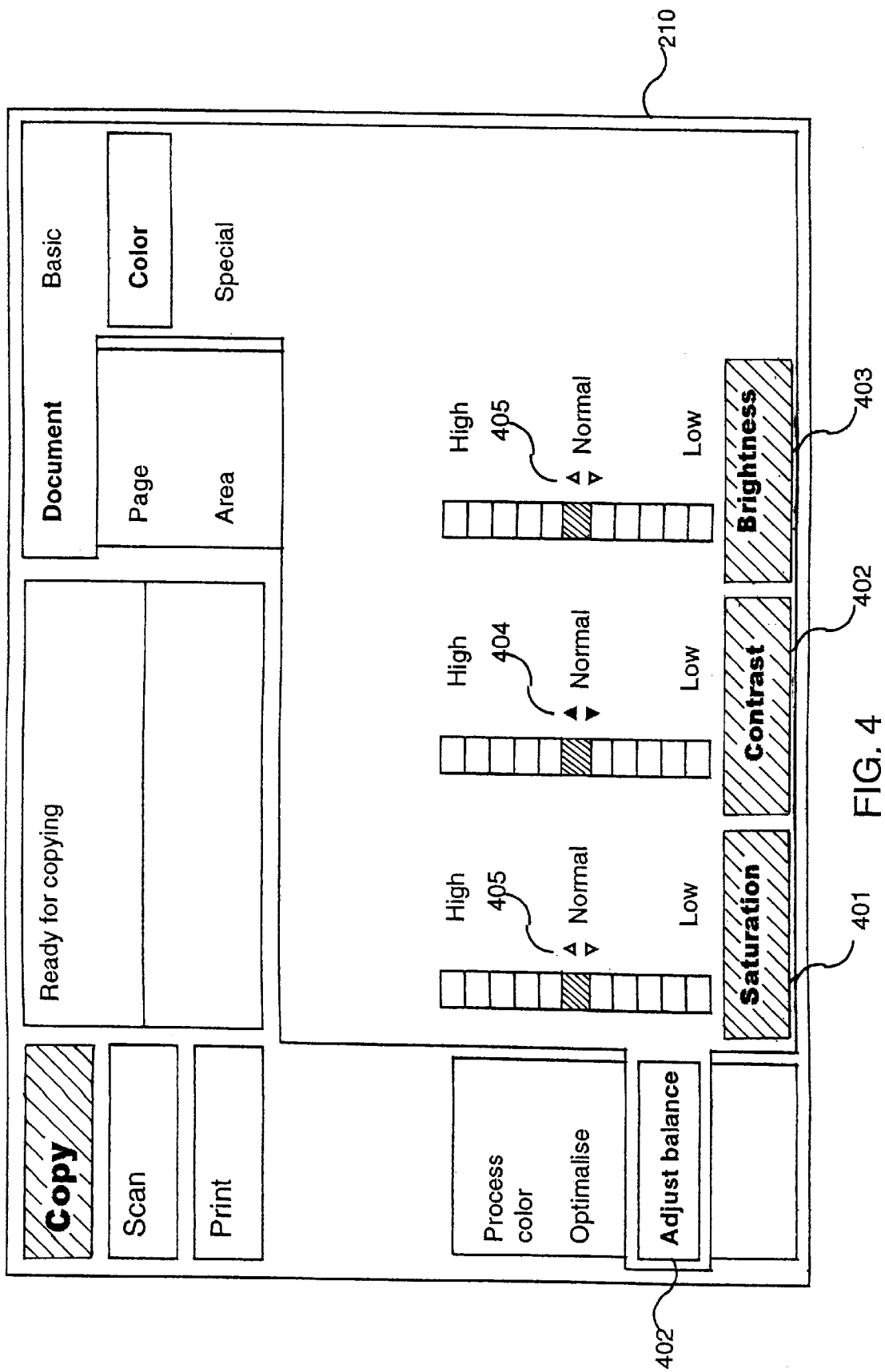
FIGS. 4, 5 and 6 show the selectable screens with copy quality functions for all the pages of a document for copying.

FIG. 4 shows the display screen 210 as displayed when the copying mode, document level, color group and balance control sub-group 402 are selected. The functions associated with this sub-group 402 are saturation 401, contrast 402, and brightness 403. The function whose setting is to be adjusted on the displayed scale is displayed by an increased contrast of a symbolic display 404 of the vertically oriented keys 242 and 243 of the key cluster 241, said display 404 being shown next to the scale. By pressing one of these keys it is possible, for example, to increase or reduce the contrast. Selection of one of the other scales is effected by pressing one of the keys 401 to 403.

Figure 5:
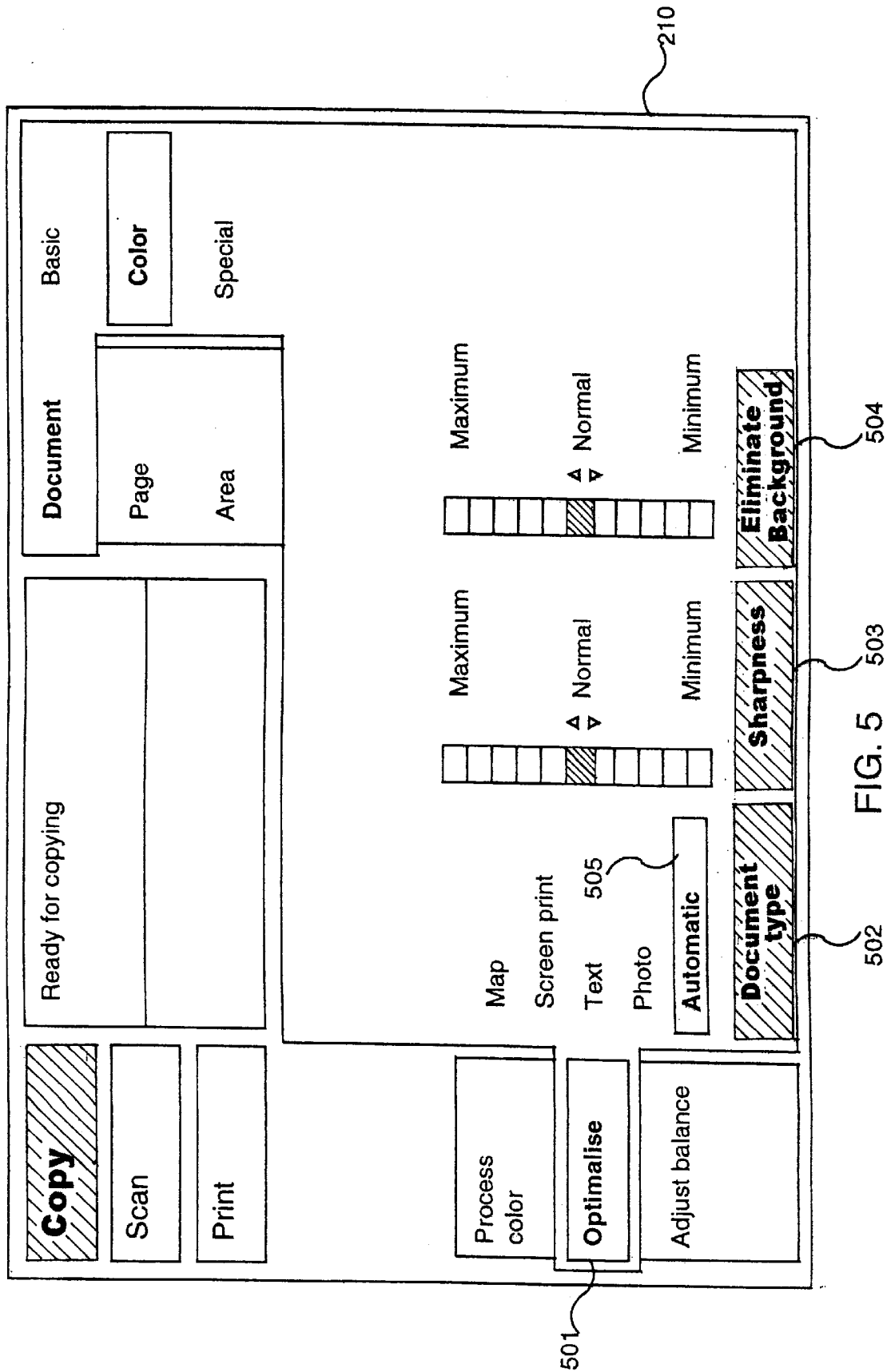

FIG. 5 shows the display screen 210 as displayed on selection of the copying mode, document level, color group and optimalization sub-group 501. The functions associated with this sub-group 501 are indicating the type of original (document 502); setting an edge-sharp enlargement (sharpness 503); and eliminating any background (eliminate background 504). The automatic option 505 of the document type function 502 refers to automatic setting of the image processing for optimal image reproduction. Of the other displayed options of the document type function 502, image processing settings are selected which are optimal for the indicated type of document.

Figure 6:
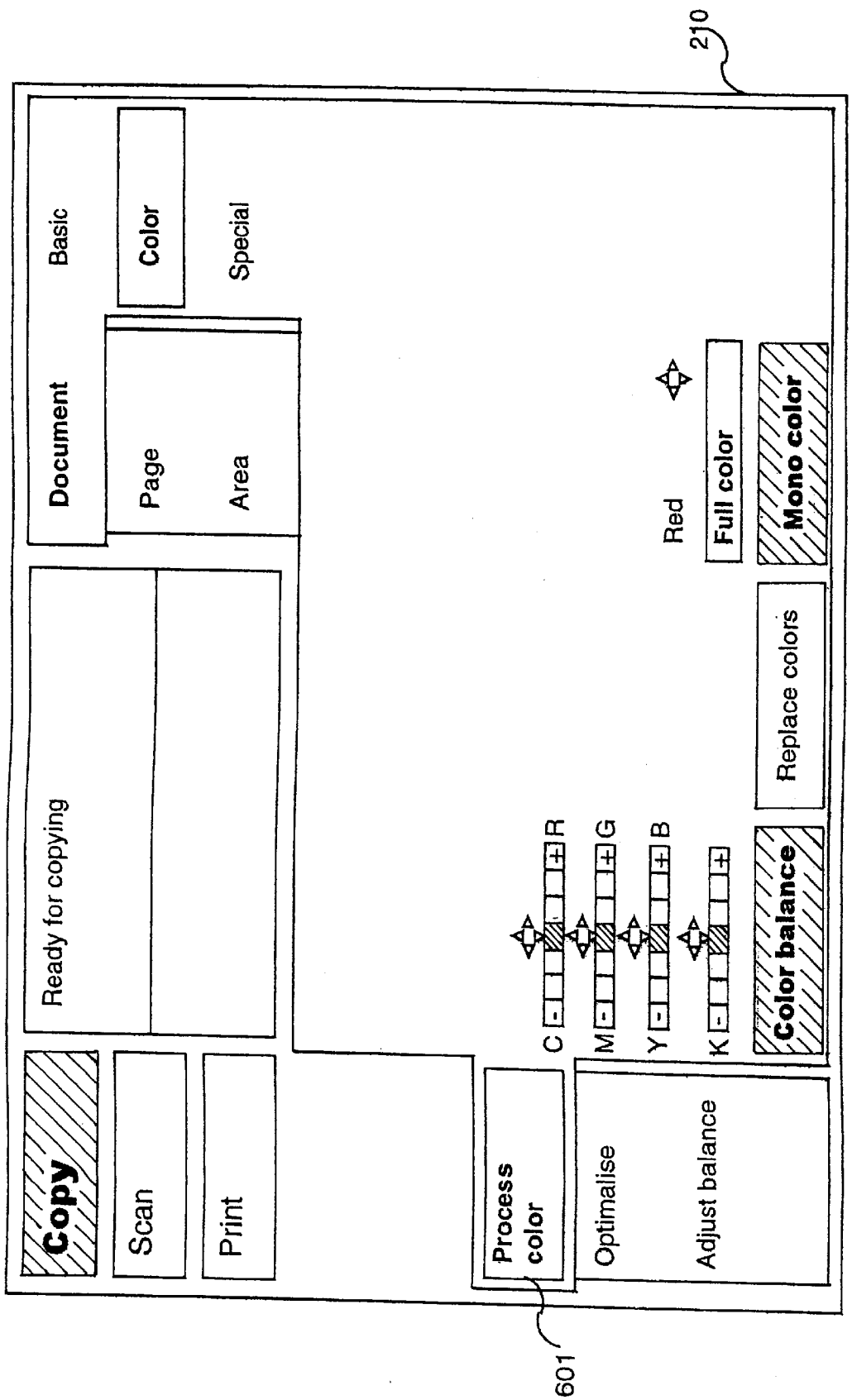

FIG. 6 shows the display screen 210 as displayed on selection of the copying mode, document level, color group and color processing sub-group 601.

Figure 7:
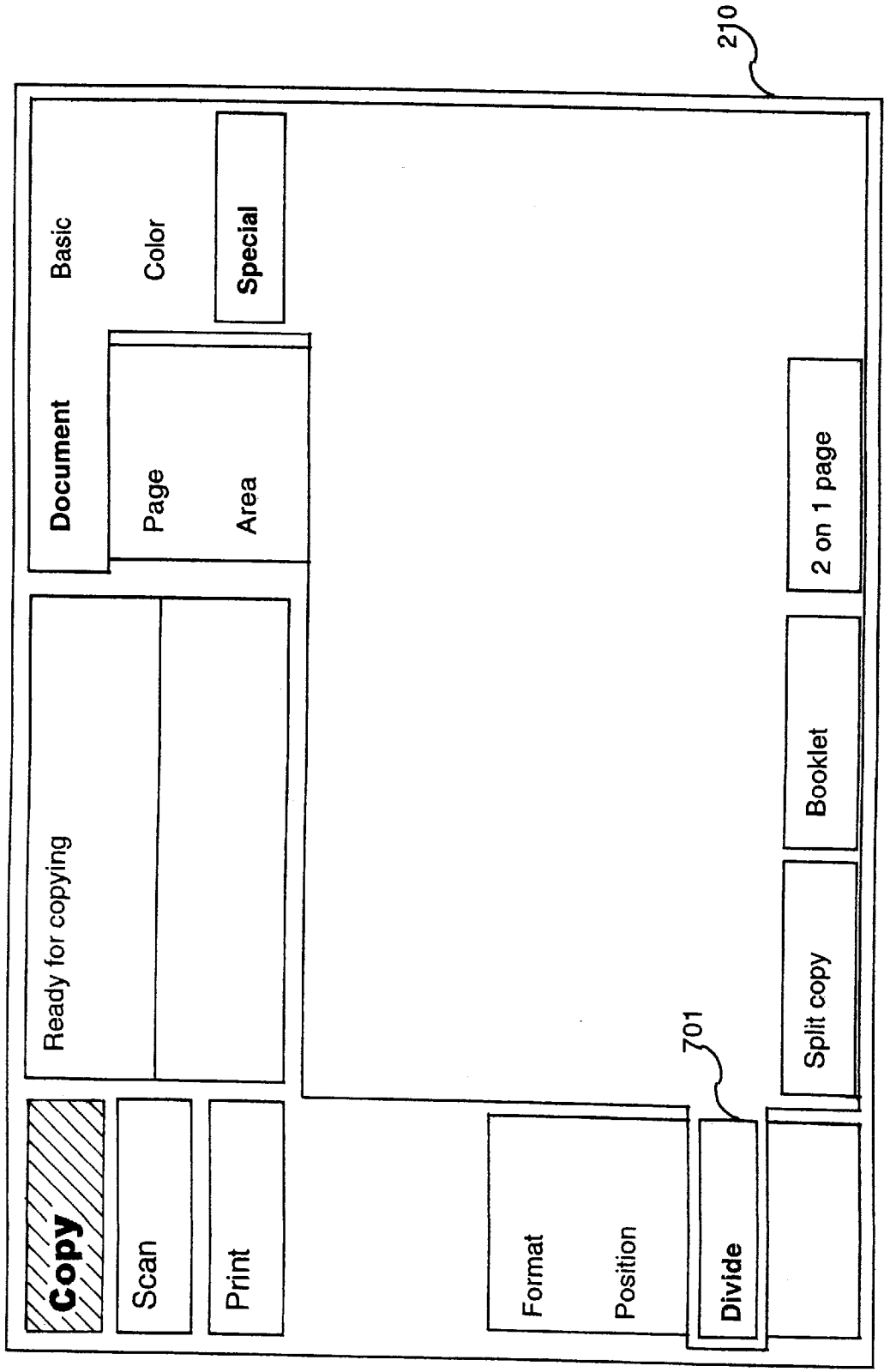
FIGS. 7, 8 and 9 show selectable screens with special functions for all the pages of a document for copying.
Figure 8:
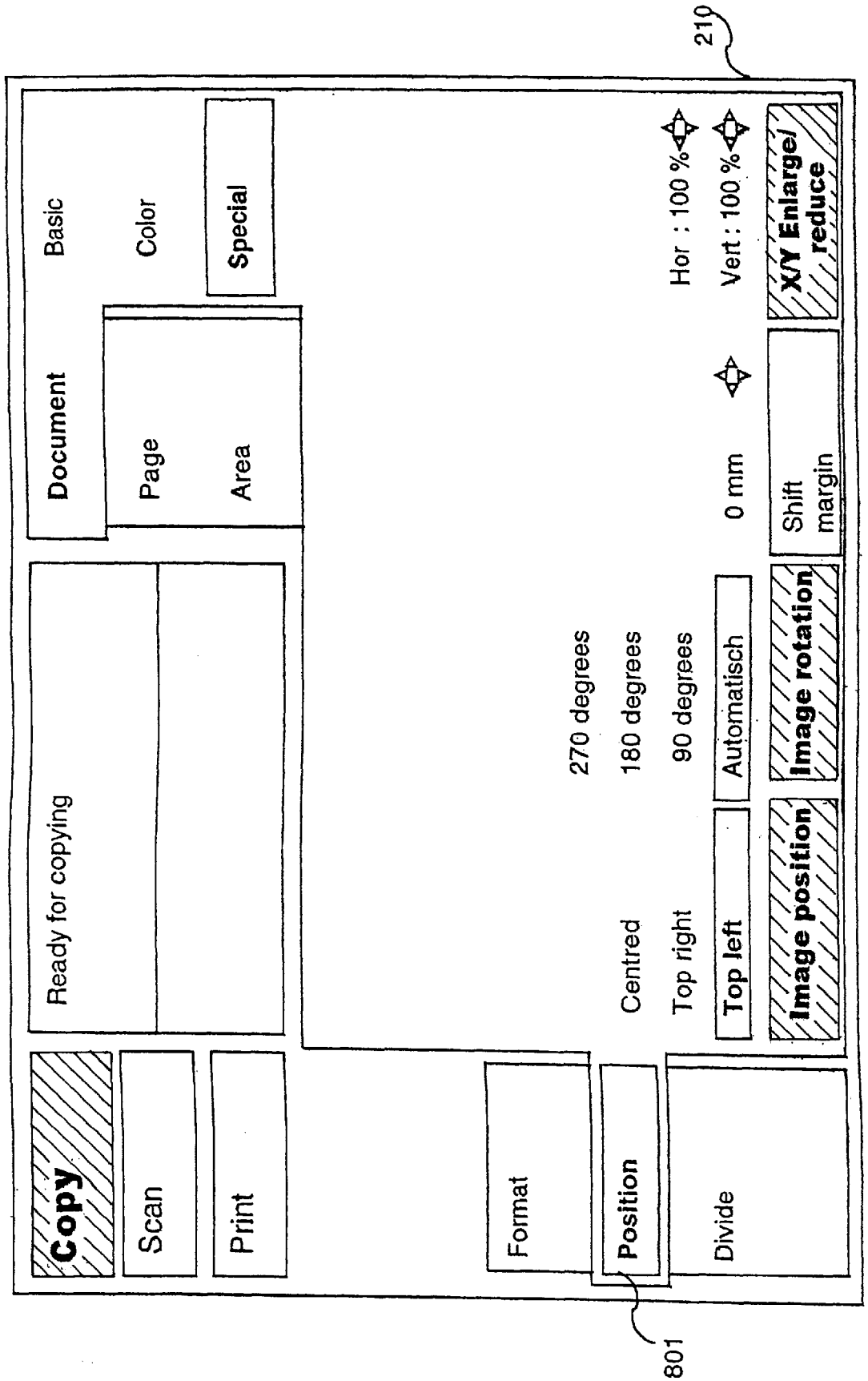
Figure 9:
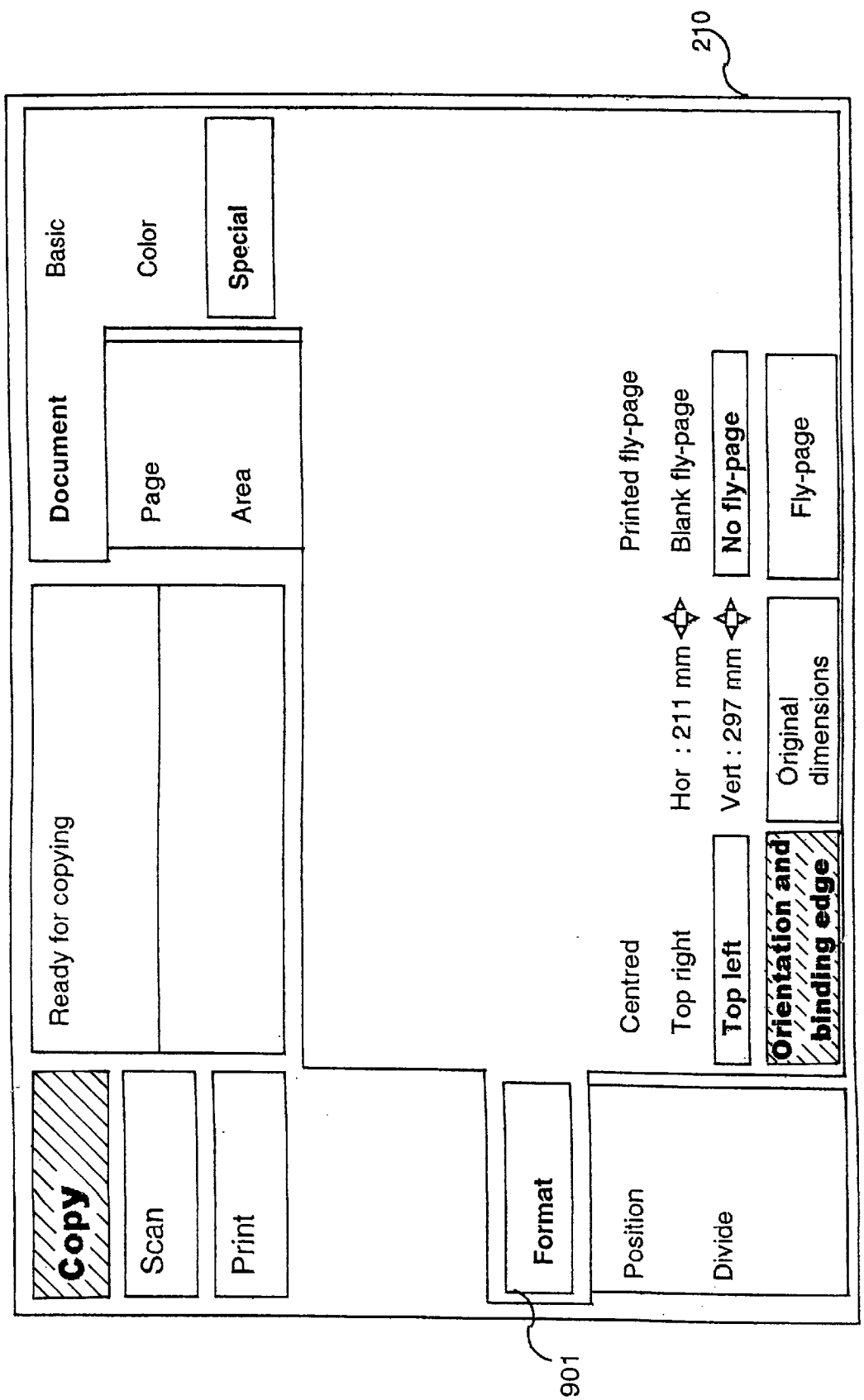

FIGS. 7, 8 and 9 respectively show the display screen 210 as displayed on selection of the copying mode, document level, special group for, respectively, the division sub-group 701, positioning sub-group 801 and format sub-group 901. The associated functions are shown in the drawings and are self-evident.

Figure 10:
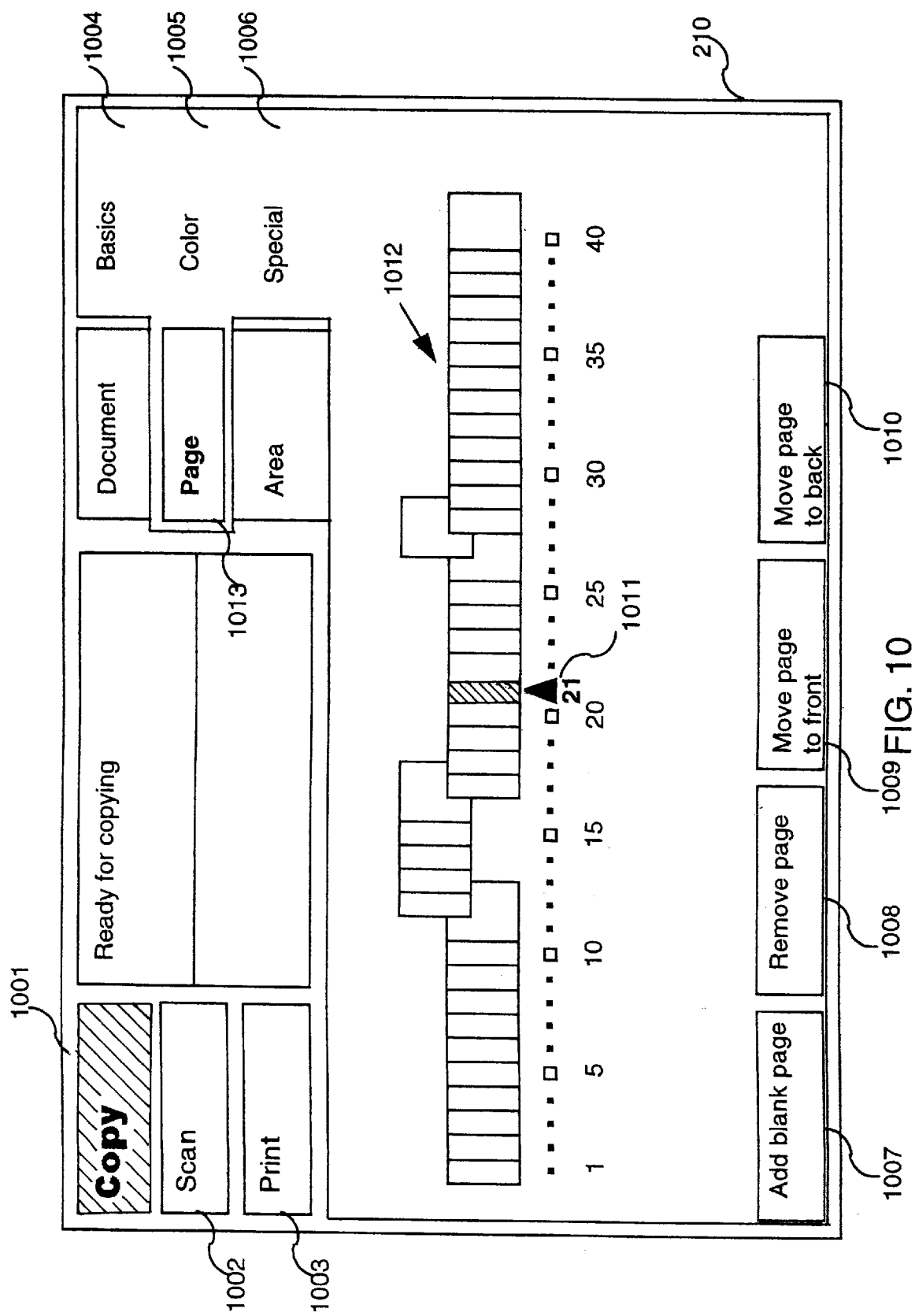
FIG. 10 shows a page selection screen for selection of a page of a document for copying.

FIG. 10 shows the display screen 210 when a specific page has to be selected. In the example displayed, the situation is shown for the copying mode 1001. However, the same selection menu is obtained in the other selectable modes of scanning 1002 and printing 1003. In these circumstances a group of functions might not yet be selected, such as the groups: basic 1004, color 1005, and print 1006. The functions displayed in that case are add empty page 1007, remove page 1008, move page to front 1009 and move page to back 1010. These functions are selectable by means of the corresponding keys 234 to 237 situated therebeneath and shown in FIG. 2. The selection of a specific page can be carried out by moving the indication of an indicator symbol loll in a symbolically displayed row 1012 of pages. The job number of the page denoted by the symbol 1011 is used for identification here. The indicator symbol can itself be moved by means of the horizontal keys 244 and 245 of the key cluster 241 shown in FIG. 2. In addition to a specific page, it is possible to select a series of pages. In the case of copying and scanning the displayed series 1012 of pages is restricted to a pure symbolic row. In the case of pages which have already been scanned previously and which must be printed subsequently in the printing mode, the content of the pages is known. A reduced reproduction of the content of these pages can then advantageously be displayed at least for the selected pages from the row 1012. If necessary, an enlarged display of a selected page can be displayed at an available part of the screen 210. Apart from being obtained by scanning, pages can also be obtained by downloading print data supplied from outside. It is then assumed that the print data are data which have been rastered in accordance with a page description language such as Postscript© or to bitmap data, either in an external or internal raster module. Finally, it should be noted that the display screen displays the page level 1013 as a selected level without one of groups 1004–1006 of functions being selected.

Figure 11:
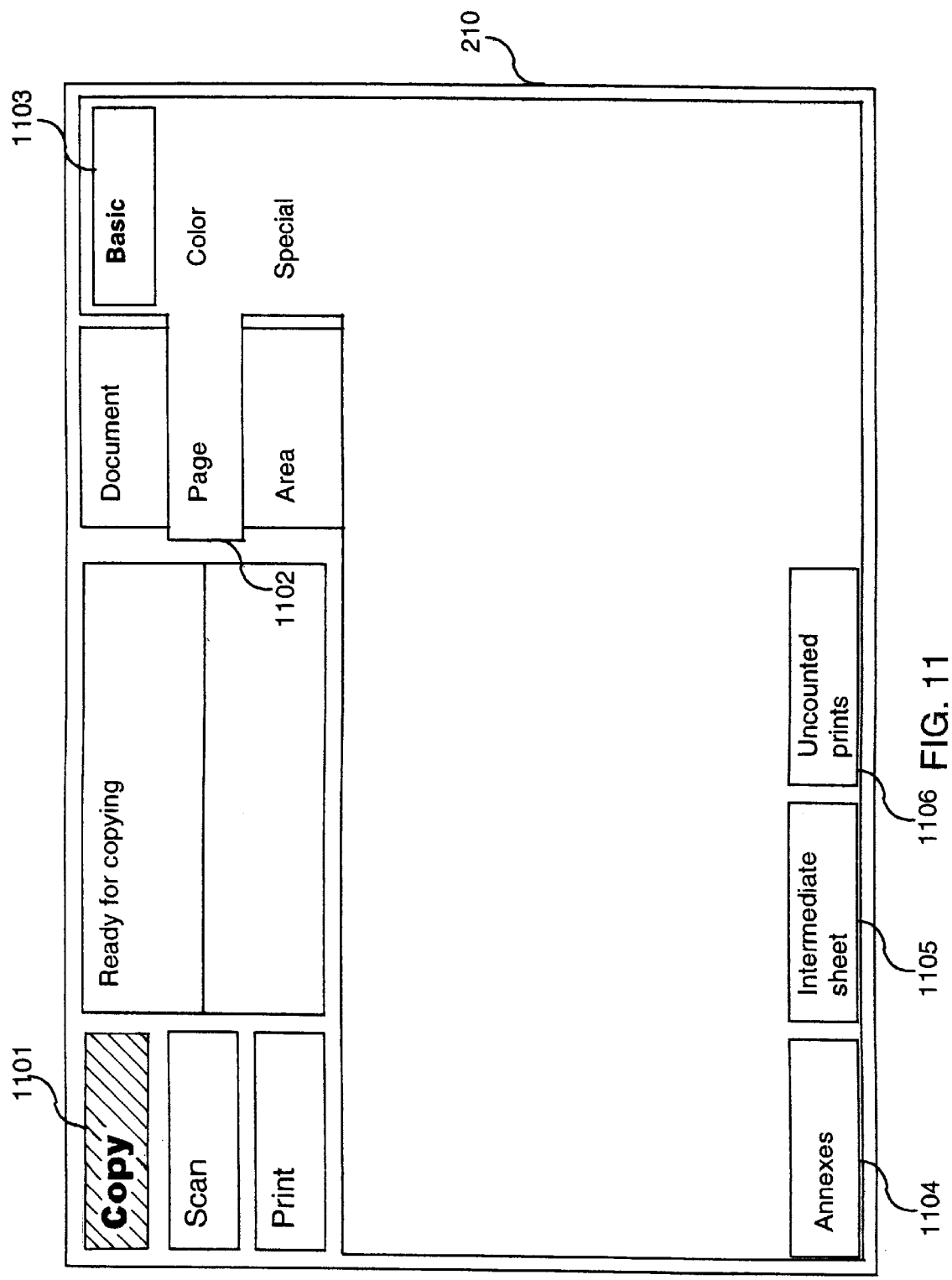
FIGS. 11, 12 and 13 show selectable screens for respectively standard functions, copy quality functions and special functions for a specific page to be copied in a document.

FIG. 11, on the other hand, shows the display screen in the copying mode 1011 at page level 1102, the group for basic functions 1103 having been selected. The displayed functions for selection are annexes 1104, intermediate sheet 1005 and uncounted prints 1106 and are all page-related functions since they relate to a specific page. For example, to add an intermediate sheet to a series of pages, it is necessary to indicate the place in that row. It is also possible to indicate what pages in the row of pages need not be charged to a user.

Figure 12:
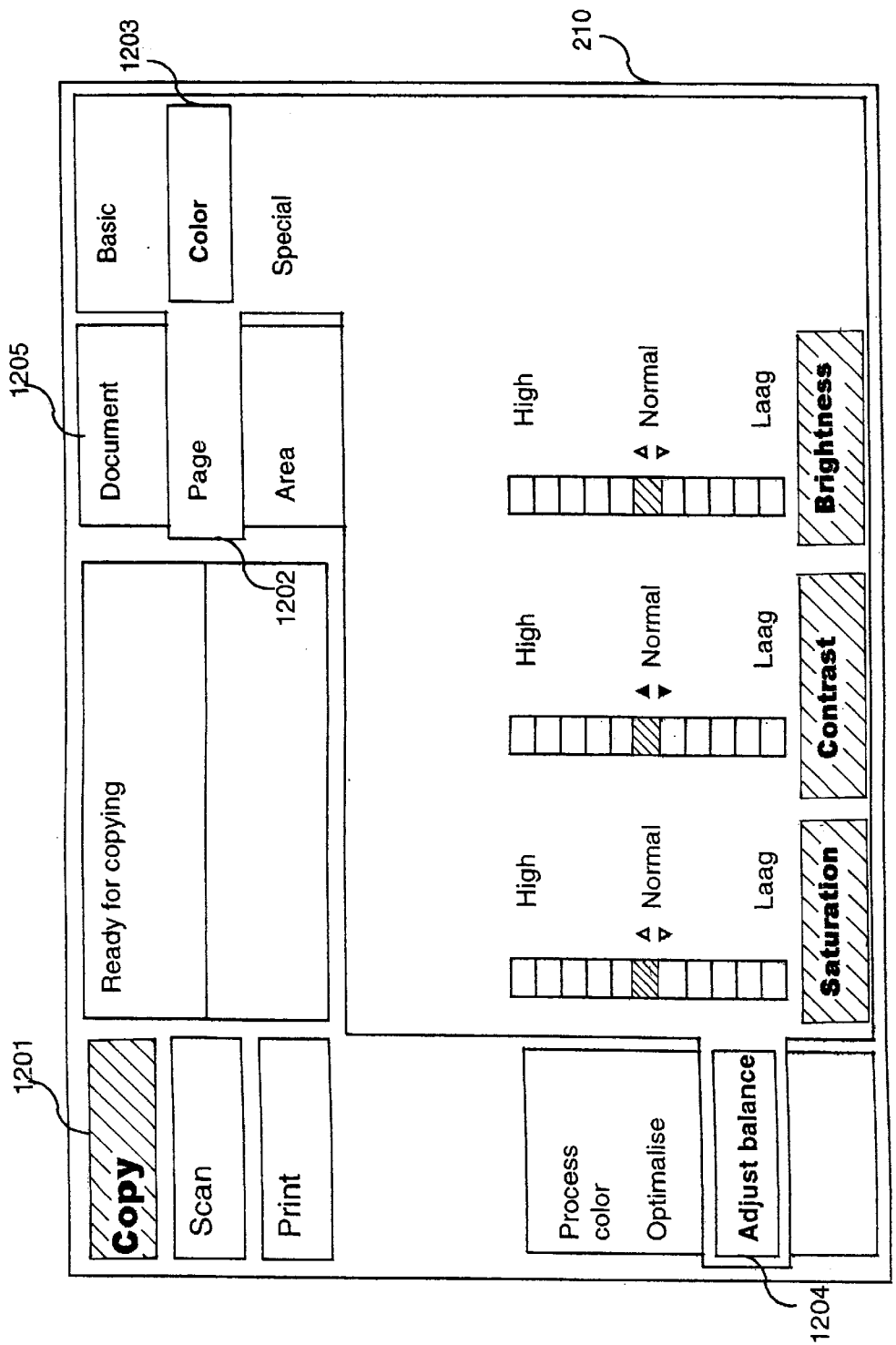

FIG. 12 shows the display screen 210 in the copying mode 1201, at page level 1202, for the group of functions relating to color 1203 and the sub-group of balance control functions 1204. In contrast to the example shown in FIG. 4 where the same functions were selected at document level 1205 and were valid for all the pages of a document, the functions now apply only to the selected page or pages.

Figure 13:
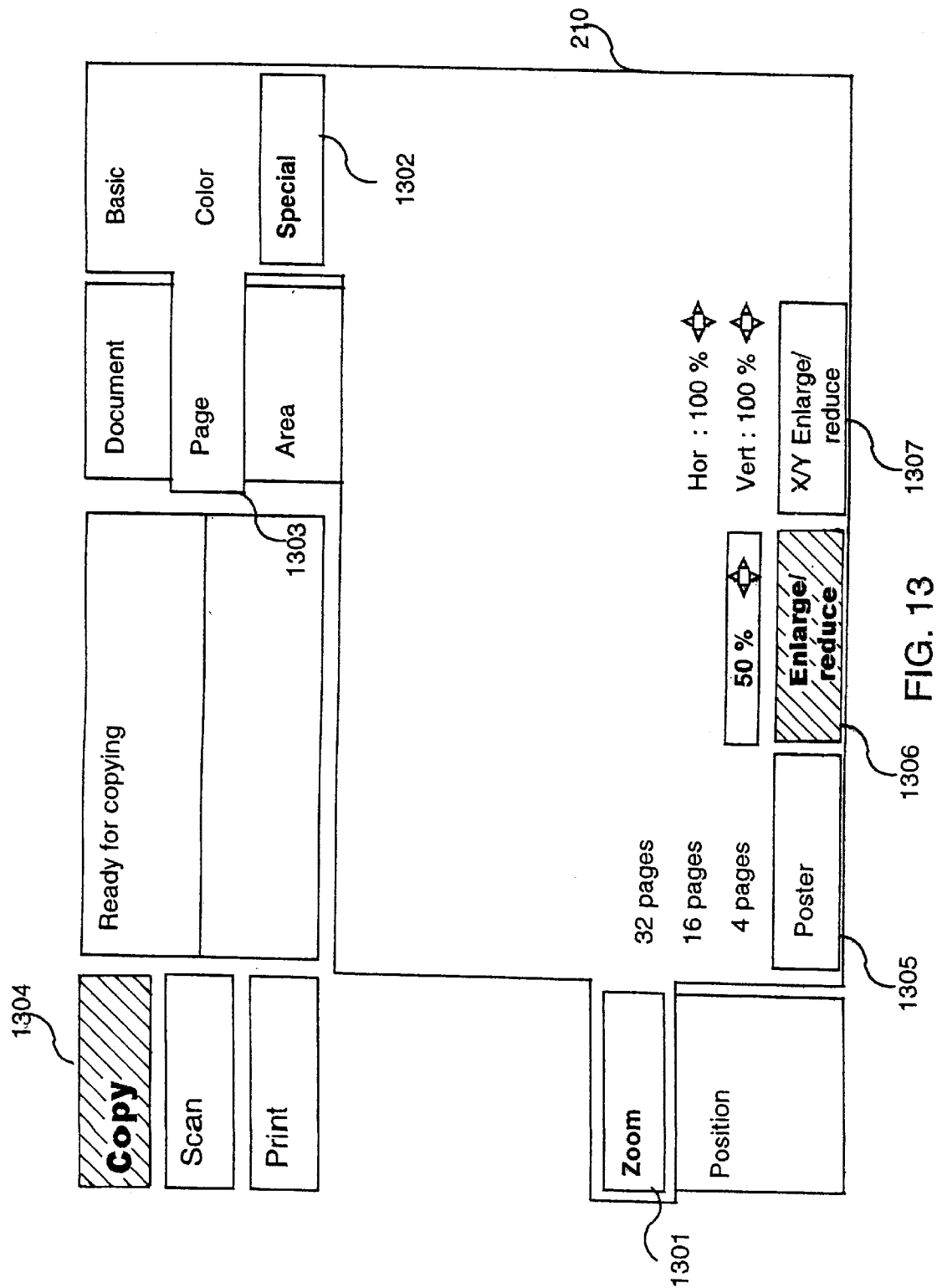

FIG. 13 shows the display screen 210 on selection of the zoom sub-group 1301 of the special group 1302 at page level 1303 in the copying mode 1304. The functions displayed are the preparation of a copy spread over a number of receiving sheets (poster 1305) with the selectable options of distribution over 4, 16 or 32 pages; changing the imaging scale of the selected page or pages (enlargement/reduction 1306); or the anamorphous use in the X and Y direction of a different imaging scale (X/Y enlargement/reduction 1307). The poster 1305 and X/Y enlargement/reduction 1307 functions are not displayed as selected, being default settings.

Figure 14:
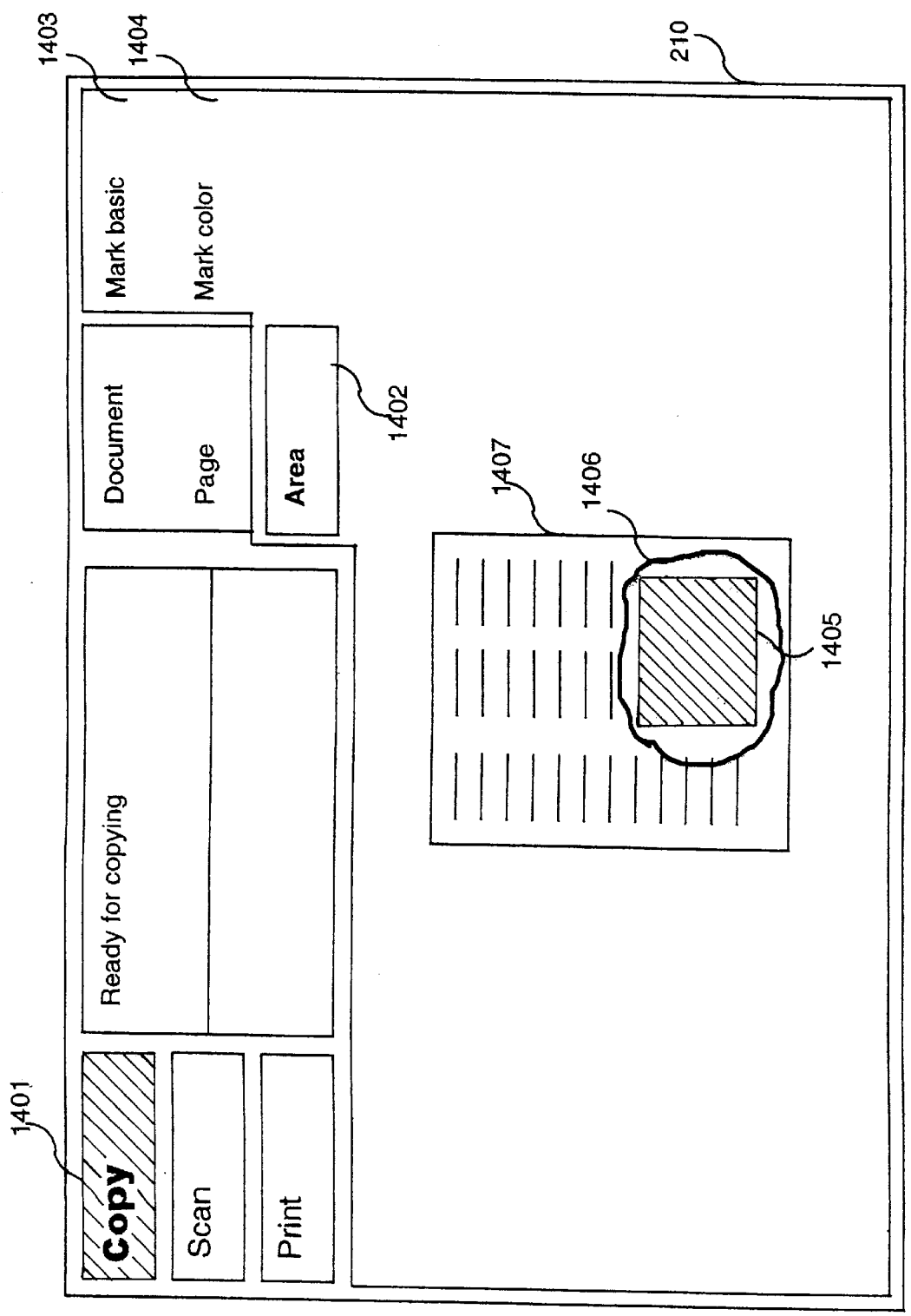
FIG. 14 shows an area selection screen for selection of an area of a page for copying in a document.

FIG. 14 shows the display screen 210 in the copying mode 1401 at the area level 1402 and non-selected groups 1403 and 1404. In this case an area 1405 of a selected page 1407 can be selected, which is defined by a marking 1406, as obtained, for example, after framing the area on the original by means of a marking pen. During copying and scanning, the content of the selected page is not yet known, so that the page 1407 displayed here is only symbolic. As will be illustrated later, with all the scanned pages it is possible to display the content of a selected page so that an area can be selected in some other way by reference to the page displayed.

Figure 15:
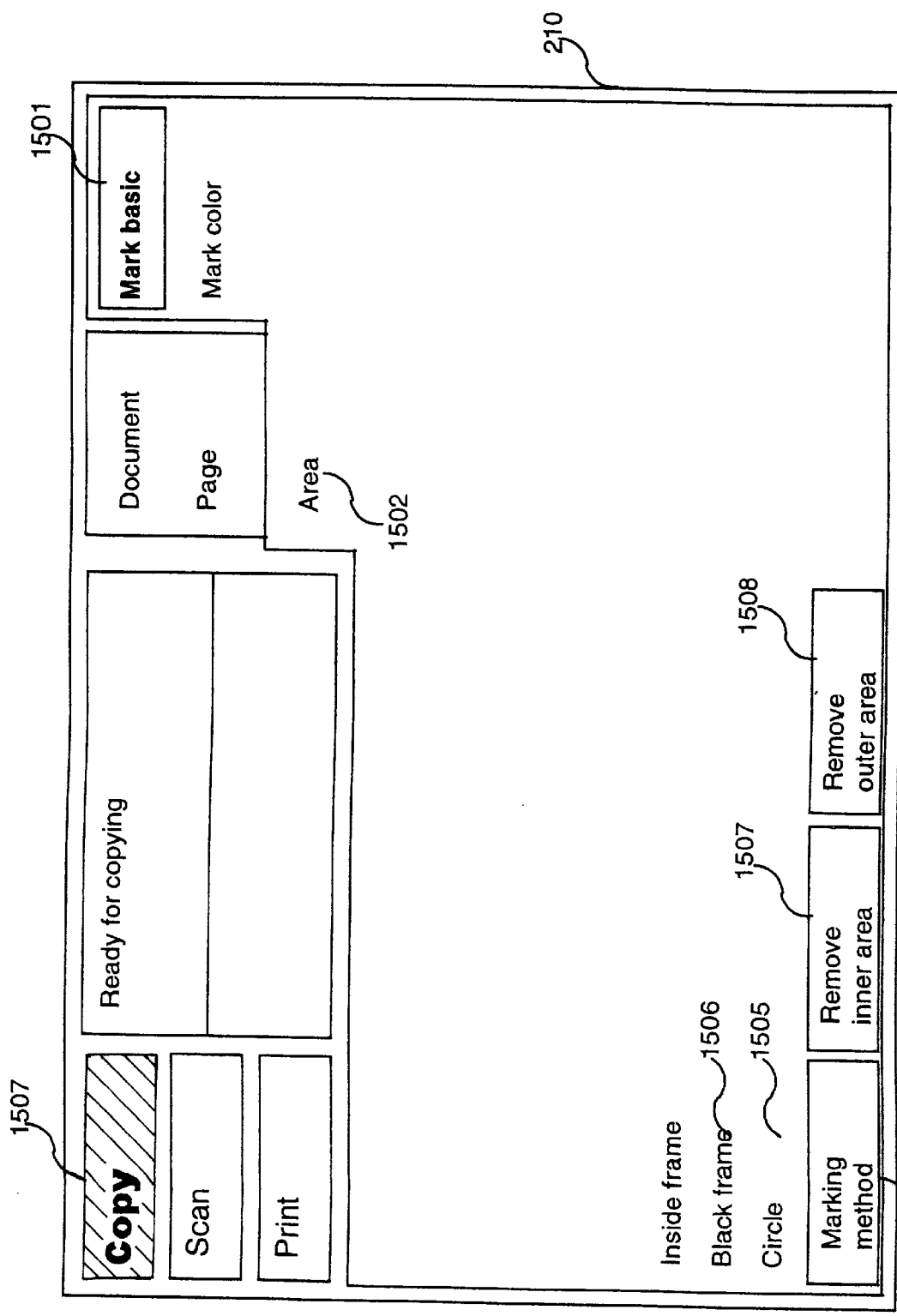
FIGS. 15 and 16 show the selectable screens for respectively standard area functions and special area functions for a page for copying.

FIG. 15 shows the display screen 210 for the selected mark base group 1501 at the area level 1502 in the copying mode 1503. The marking method function 1504 displayed indicates the options as to which marking method is to be used. The circling option 1505 indicates selection of an area on the basis of a previously applied marking with a marking pen, while the black frame option 1506 carries out the selection on the basis of an existing black frame around an area.

The remove inner area 1507 and remove outer area 1508 functions are elementary functions which can be carried out on areas thus selected.

Figure 16:
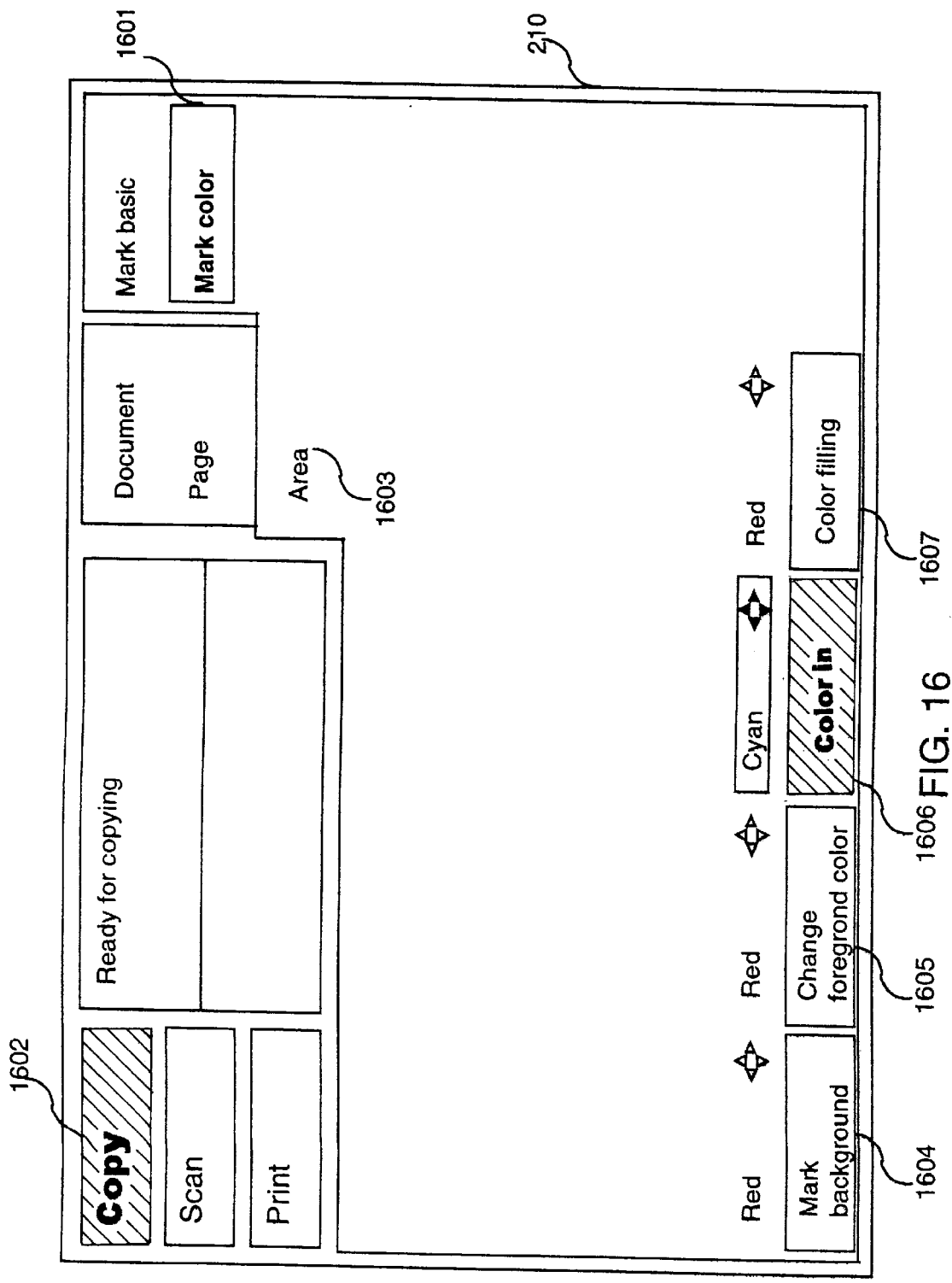

FIG. 16 shows the display screen 210 on selection of the mark color group 1601 in the case of the copying mode 1602 at the area level 1603. The functions corresponding thereto relate, for example, to changing the colors to be printed for either the background (mark background 1604); or the foreground (change foreground color 1604). The first function may involve the addition of a striking color as a background for a piece of text, while the second function may involve changing the color of the text itself. A target color can also be selected by means of the key cluster 241 shown in FIG. 2.

Figure 17:
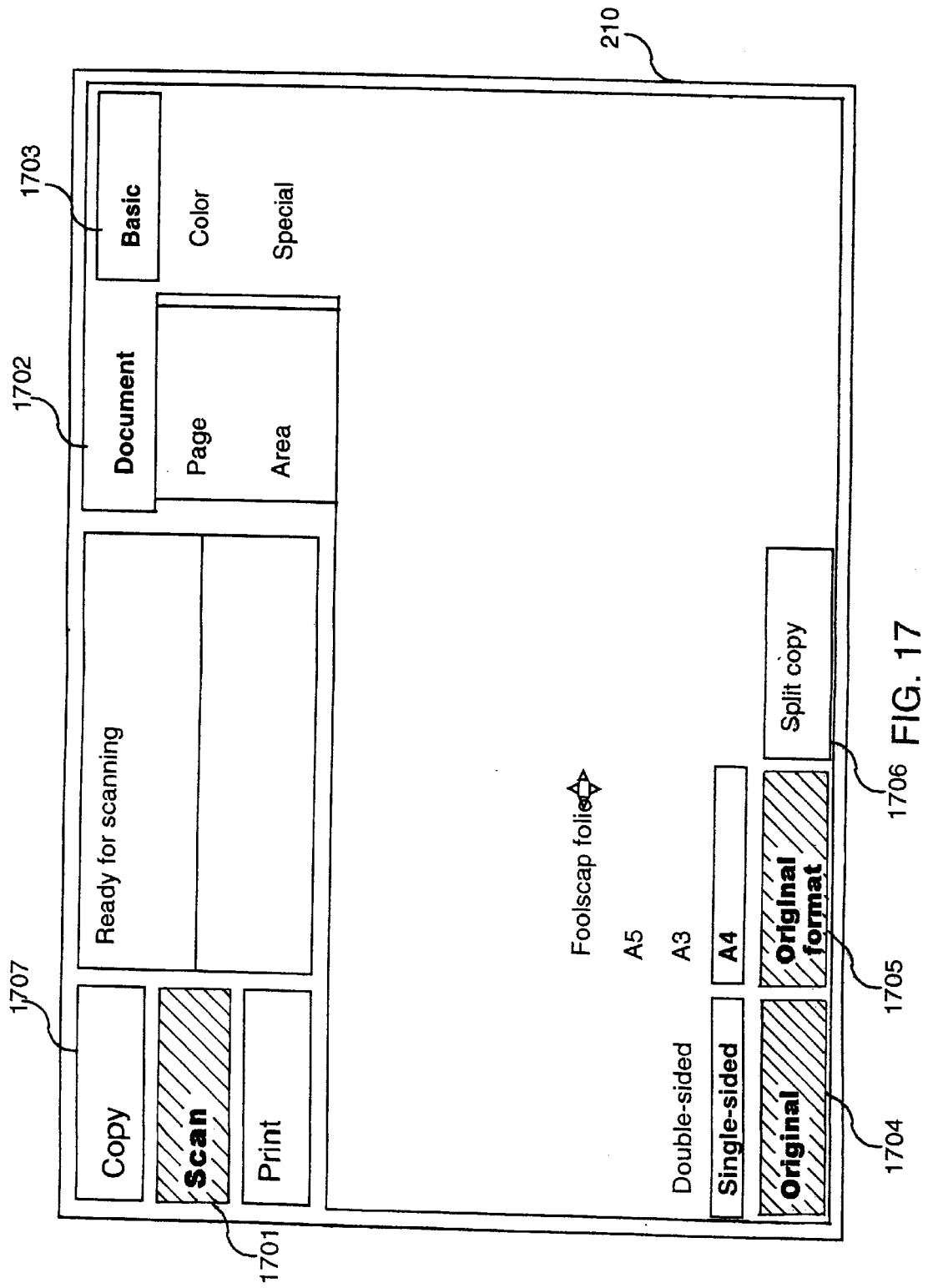
FIG. 17 shows a screen with standard functions for all the pages of the document for scanning.

FIG. 17 shows the display screen 210 on selection of the scanning mode 1701 at document level 1702 and for the basic group 1703. The functions displayed are reduced to the functions 1704 to 1706 as shown in FIG. 3 in respect of the copying mode 1707. The functions shown in FIG. 3 relating to printing, such as covers 303 and finishing 304 of course are unnecessary in the scanning mode 1701. The most that must be indicated is whether the original supplied for scanning is single-sided or double-sided (original 1704); its format (original format 1705); and whether in some cases it relates to the scanning of a book (split copy 1706).

Figure 18:
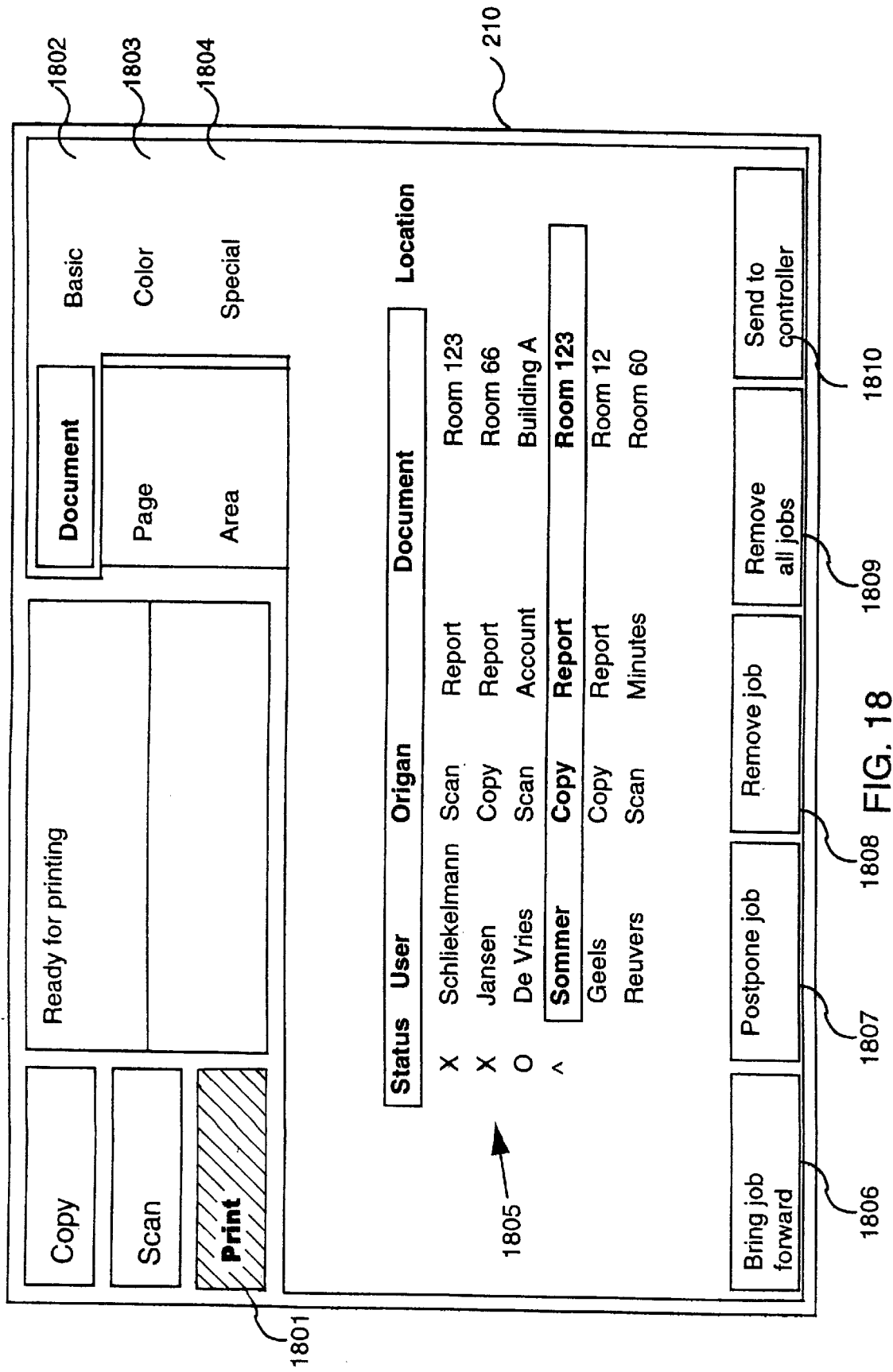
FIG. 18 shows a document selection screen for the selection of a document for printing.

FIG. 18 shows the display screen 210 in the printing mode 1801, in which it is required to print documents which are already stored in an internal memory, either by scanning or by an external supply. Unless the basic 1802, color 1803 and special 1804 groups have been selected, the display screen 210 displays a list 1805 of jobs which have already been processed or not. The status column can indicate whether an job has already been processed (X), is still awaiting an additional treatment (O), is in progress (^) or is still waiting ( ). The selected job, indicated by a framing, can change place in the list 1805 by means of the functions bring job forward 1806 and postpone job 1807. The selected job can also be removed at remove job 1808 or all jobs can be removed at remove all jobs 1809. A selected job can also be sent to an external machine, for example a work station as indicated at send to controller 1810. The list 1805 can also display information relating to a job, such as the origin of the documents of the job as obtained after just scanning or after copying.

The selections for the printing mode will be compared, by reference to the following Figures, with the above-described corresponding selections for the copying mode. It will be apparent that frequently one or more displayed functions will differ between these modes. Thus although the user is confronted with a practically similar operating approach for both modes, it is nevertheless possible to meet the differences in respect of desirable or possible functions for both modes.

Figure 19:
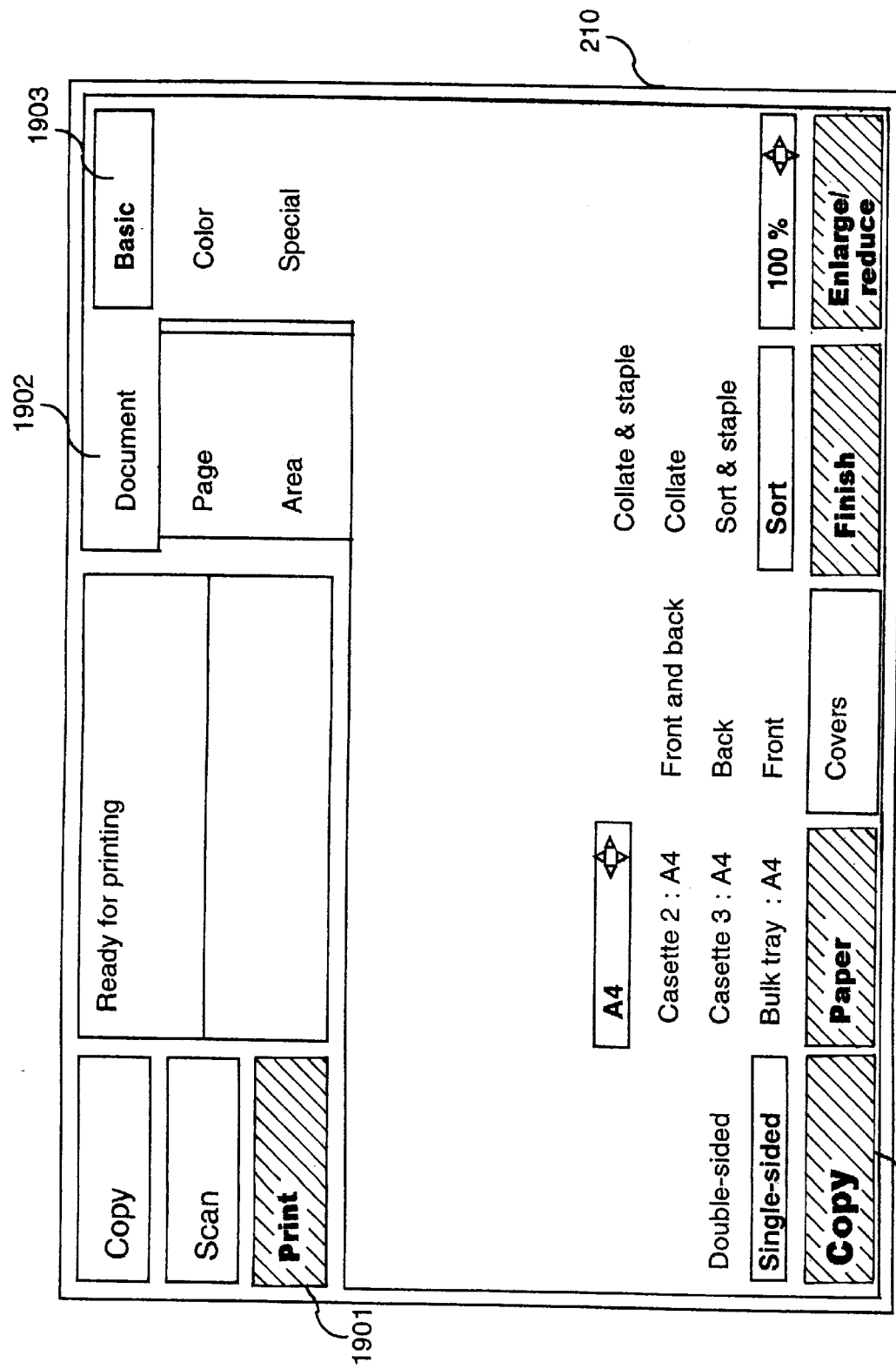
FIGS. 19, 20 and 21 show the selectable screens for respectively standard functions, copy quality apparatus functions and special apparatus functions for all the pages of a document for printing.

FIG. 19 shows the display screen 210 as displayed in the printing mode 1901 at document level 1902 and for the basic group 1903 of functions. With regard to the corresponding selection shown in FIG. 3 for the copying mode, only the copy function 1904 replaces the original>copy function 301 shown in FIG. 3.

Figure 20:
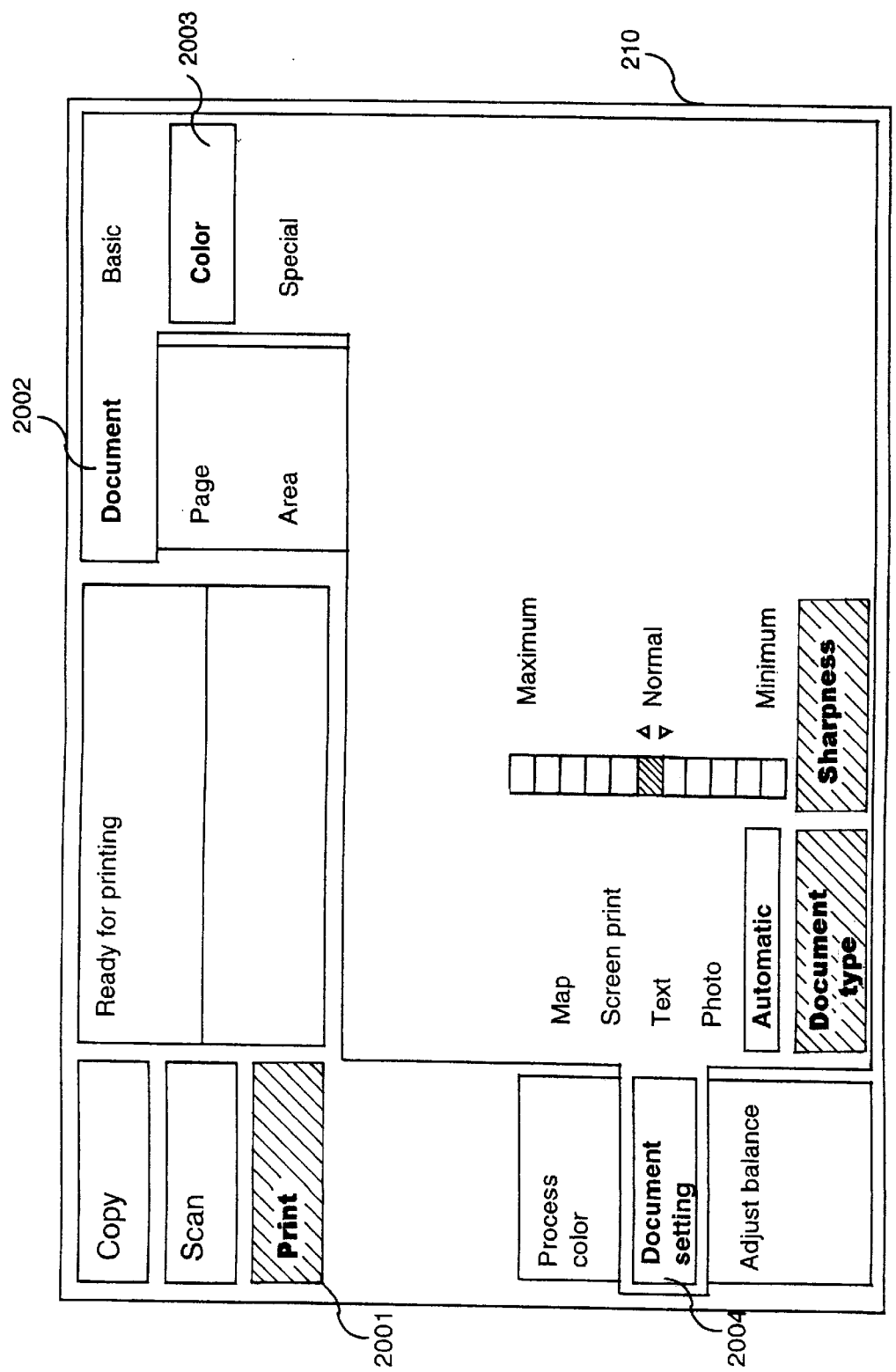

FIG. 20 shows the display screen 210 as displayed in the printing mode 2001 at document level 2002 for the document setting sub-group 2004 of the color group 2003 of functions. With regard to the corresponding selection shown in FIG. 5 for the copying mode, the eliminate background function 504 displayed there is now absent.

Figure 21:
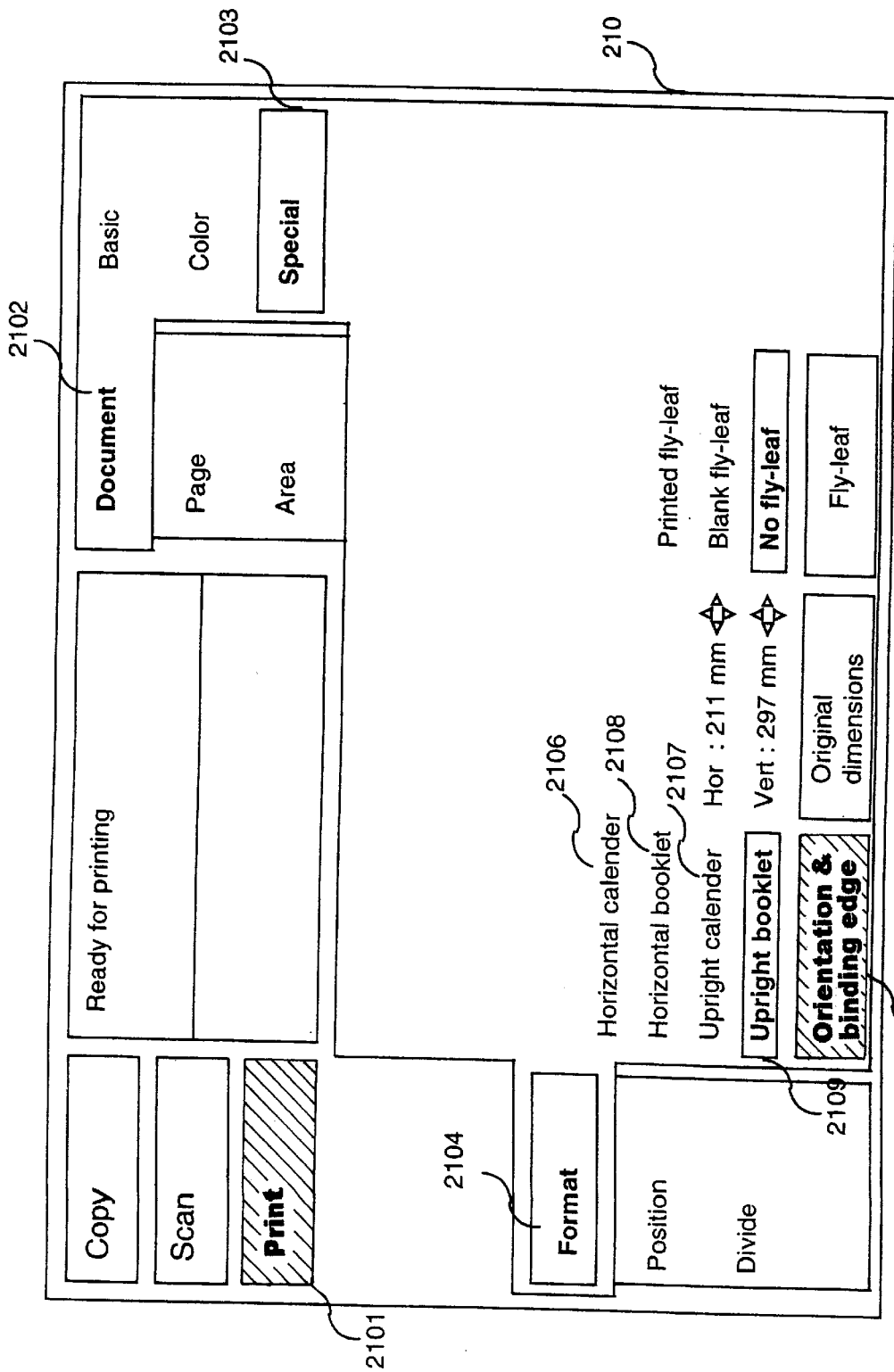

FIG. 21 shows the display screen 210 as displayed in the printing mode 2101, at document level 2102 for the format sub-group 2104 of the special group 2103. With regard to the corresponding selection shown in FIG. 9 for the copying mode, the orientation and binding edge 2105 function has the options of collecting prints in the calendar 2106, 2107 or book format 2108, 2109. In the copying mode, only the position of the text on the copy sheet can be adjusted with this function.

Figure 22:
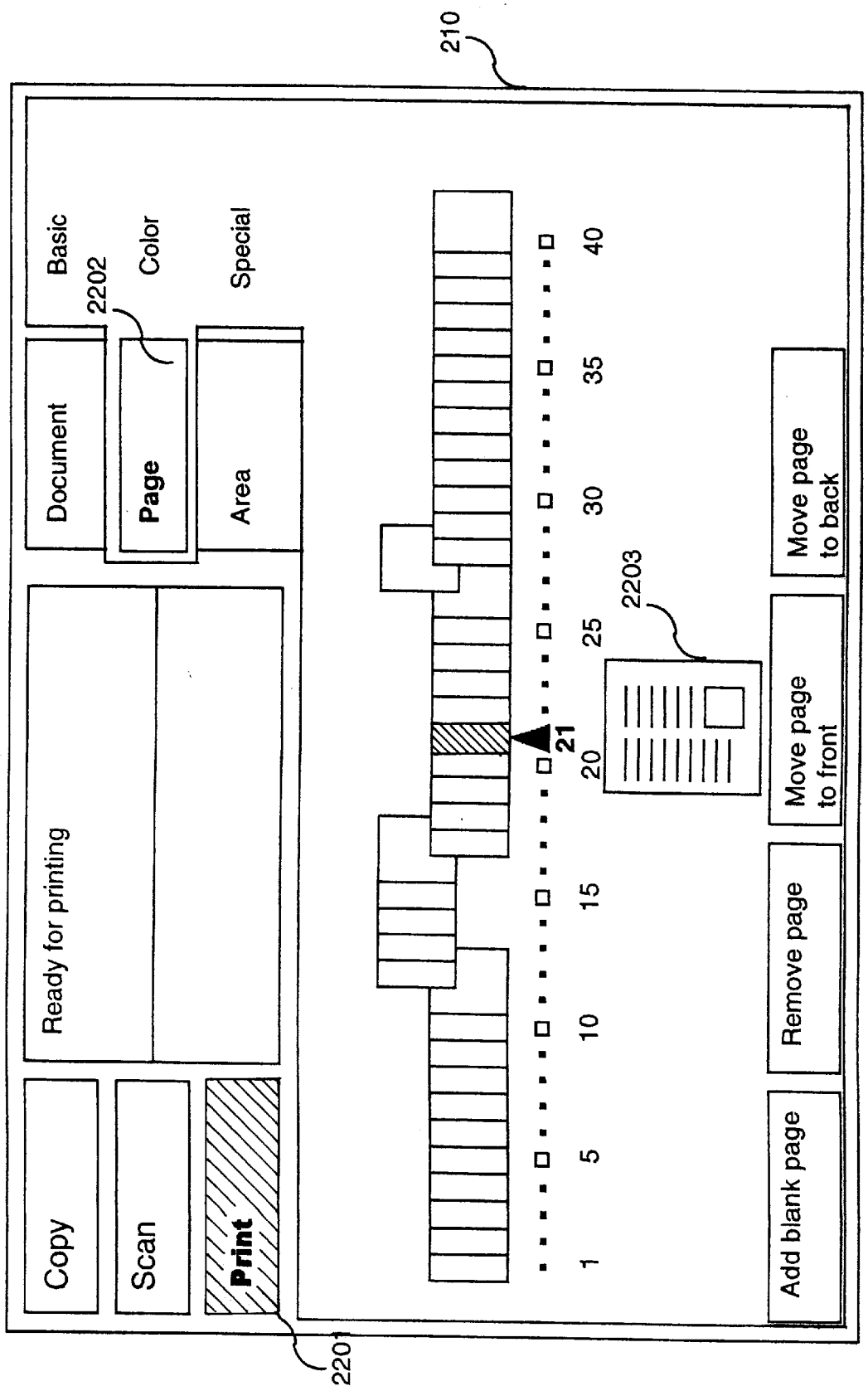
FIG. 22 shows a page selection screen for selection of a page for a document for printing.

FIG. 22 shows the display screen 210 in the printing mode 2201 at page level 2202, where no group of functions has yet been selected. In this case the user has the facility of selecting one or more pages from a series of pages for printing. The display is practically identical to the display shown in FIG. 10 for the corresponding selection in the copying mode. The difference now, however, is that the content of the different pages is known, so that it is possible advantageously to use a reduced display 2203 of the content of a selected page.

Figure 23:
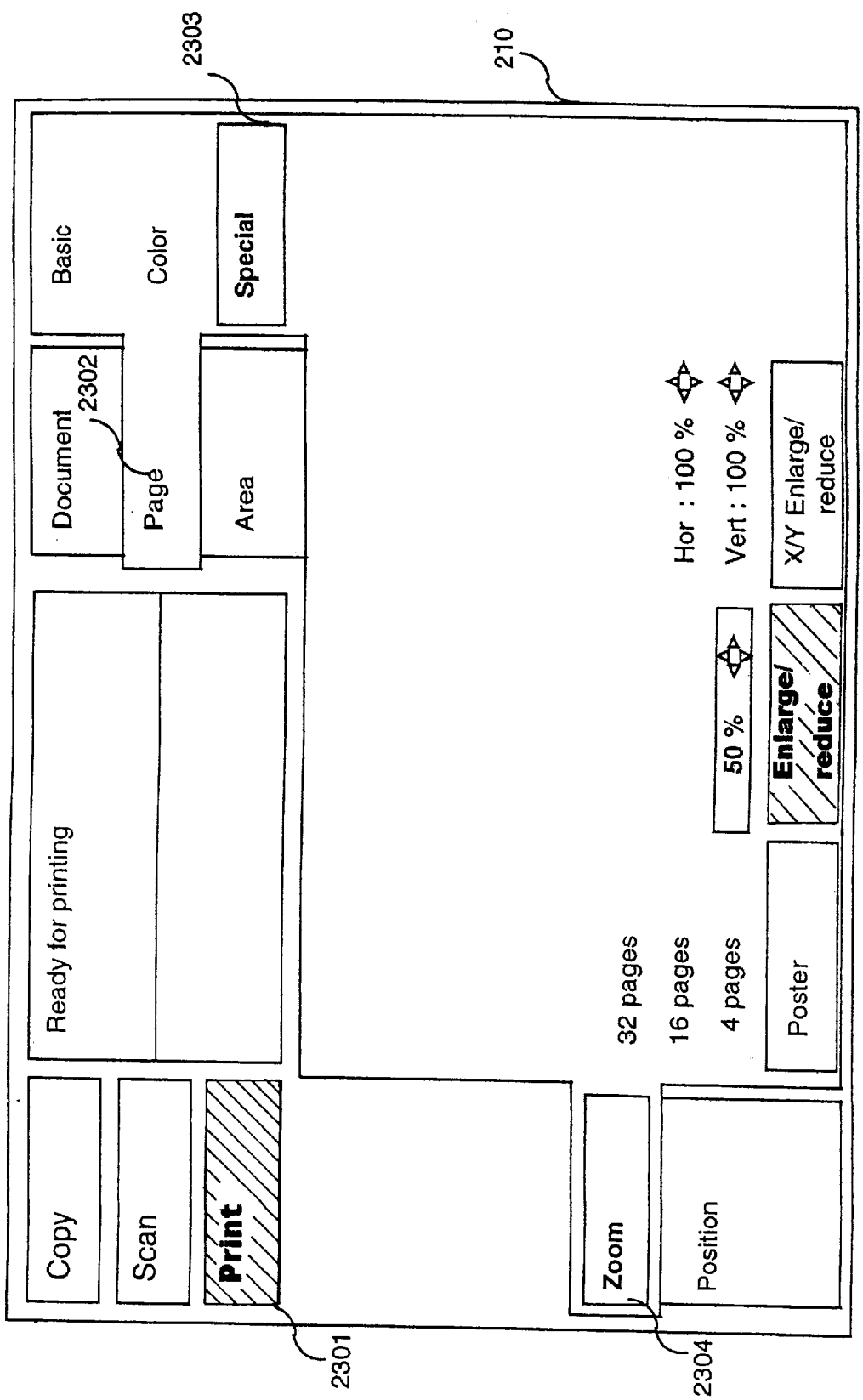
FIG. 23 shows a screen with special functions for a page for printing.

FIG. 23 shows the display screen 210 as displayed in the printing mode 2301, at page level 2302 for the zoom sub-group 2304 of the special group 2303. Here the functions displayed are identical to the functions shown in FIG. 13 for the corresponding selection in the copying mode.

Figure 24:
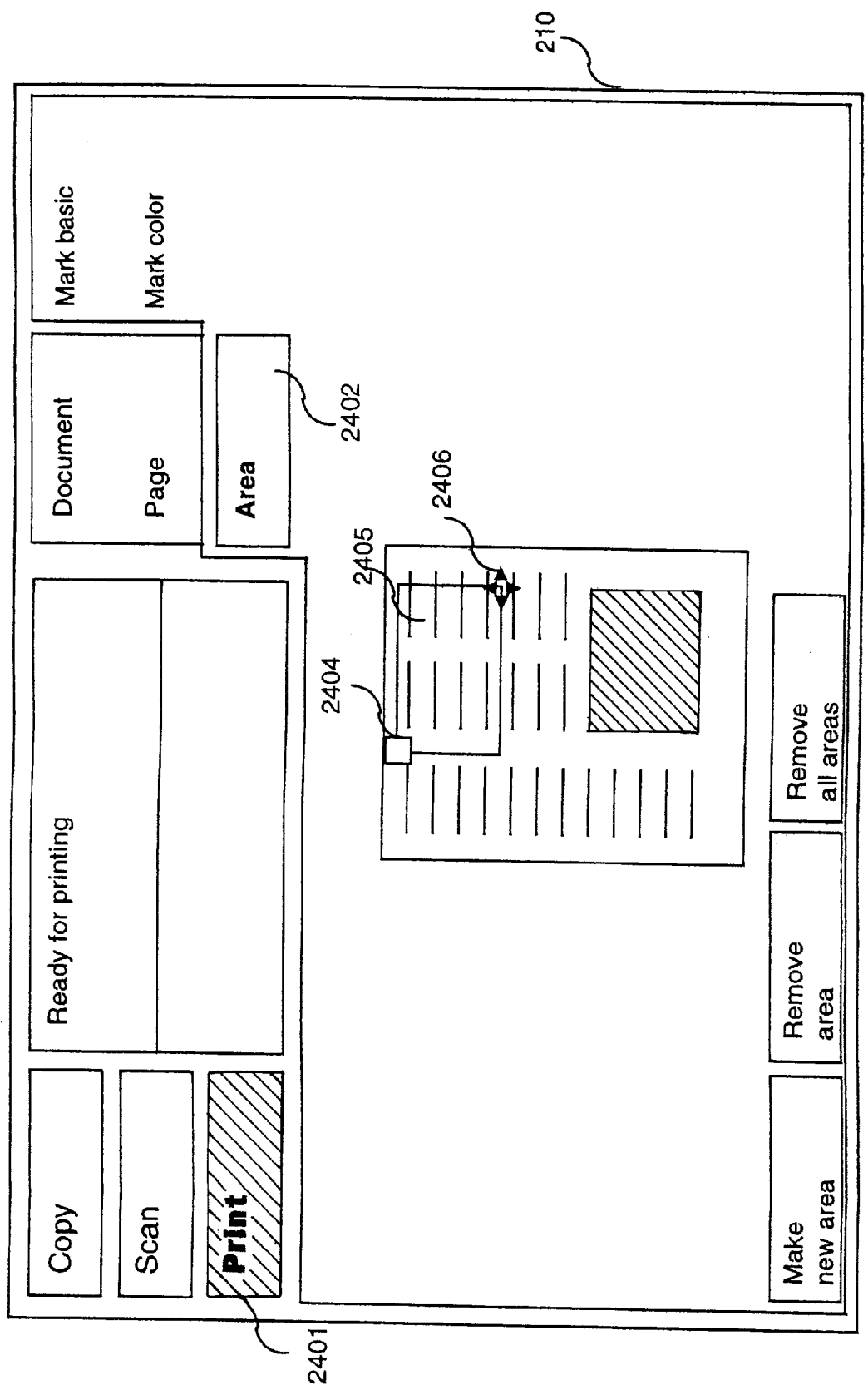
FIG. 24 shows a selection screen for selection of an area of a page for printing.

Finally, FIG. 24 shows the display screen 210 in the printing mode 2401, at area level 2402, where no group of functions has yet been selected. The user now has the opportunity of selecting an area of a selected page. In contrast with the corresponding selection shown in FIG. 14 for the copying mode, there are now other possibilities of making an area selection. By the possibility of displaying the content of the selected page in reduced form, it is now possible retrospectively to indicate, for example by means of the key cluster 241, a rectangular area 2405 for selection, by indicating the corner point 2404 thereof at the top left and the corner point 2403 at the bottom right in the page.

Figure 25:
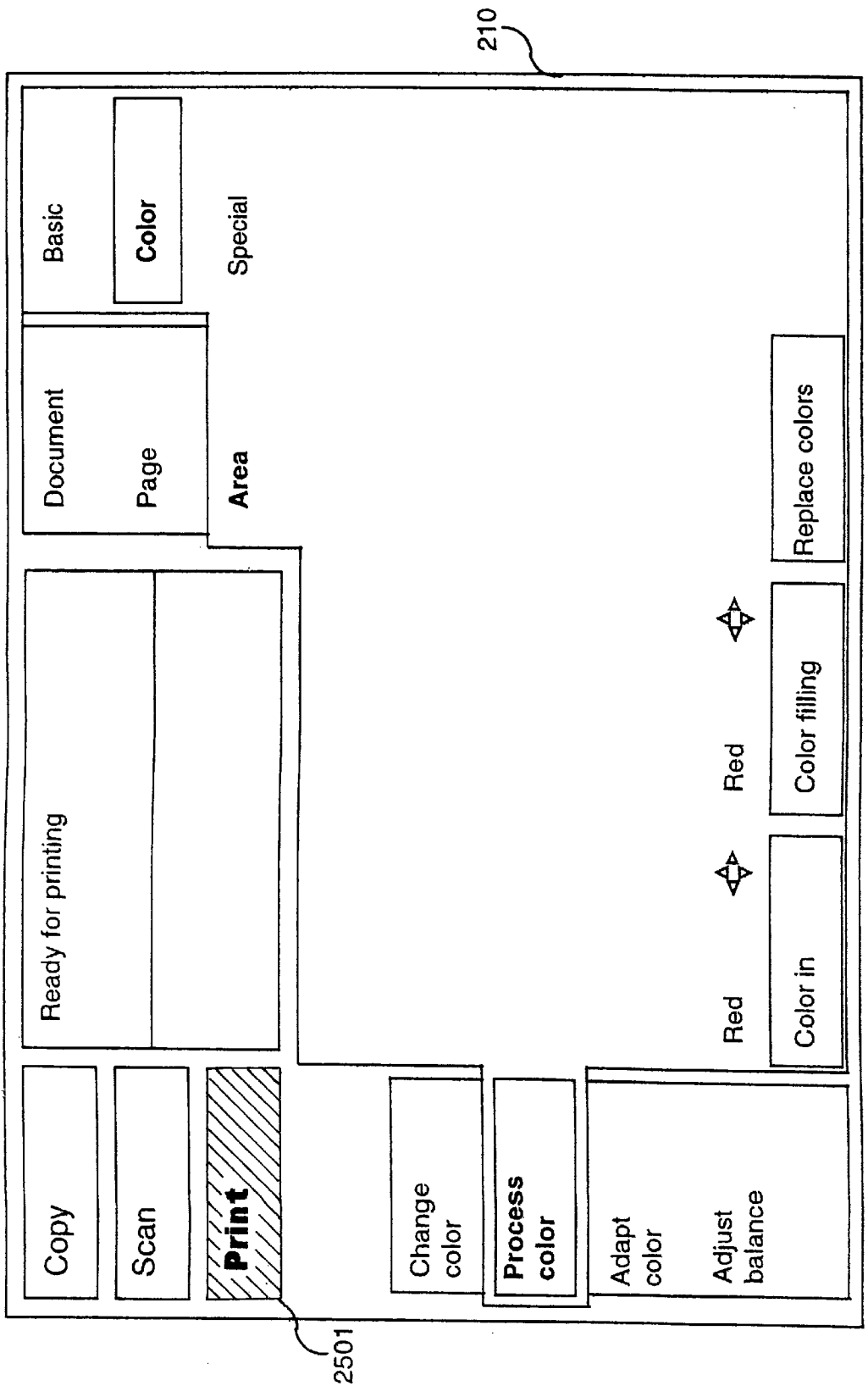
FIGS. 25 and 26 show the selectable screens for copy quality functions and special functions for part of a page for printing.
Figure 26:
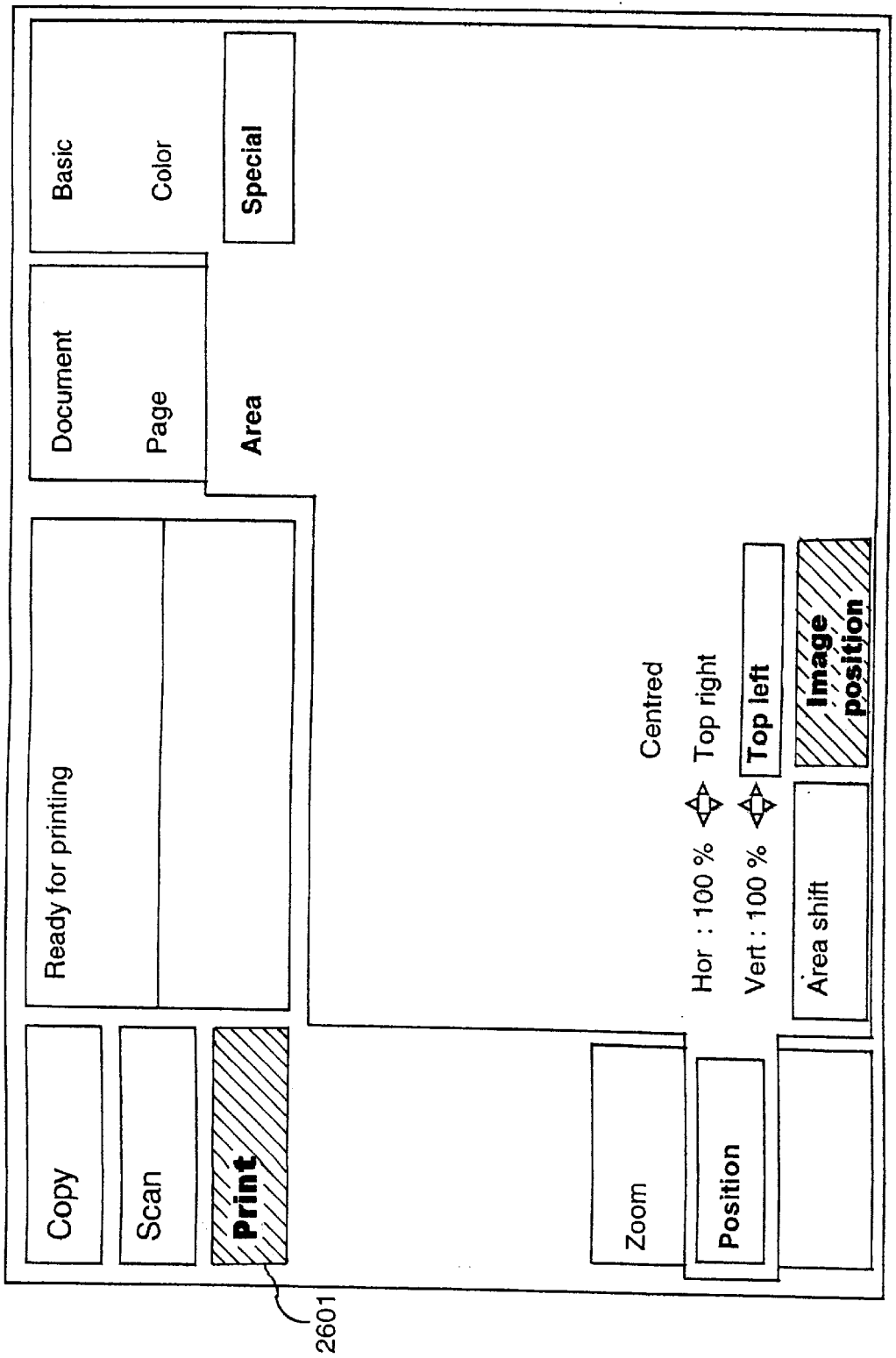

Finally, FIGS. 25 and 26 give examples of the display screen 210 in the printing mode 2501, 2601 for two different selections.

In the above-described embodiment, documents, pages and areas of pages can be selected with a display screen as obtained by not yet selecting the basic, color and special groups for the functions. If a level is selected, then in the first instance the screen will be displayed for selection of the document, page or area belonging to that level. The groups are then as a standard not yet selected.

The embodiment described is also characterized in that the reproduction device to be used is presented to the user as a hybrid apparatus, which can act as one of three possible machines, i.e. as a copying machine, a scanner and a printer.

Figure 27:
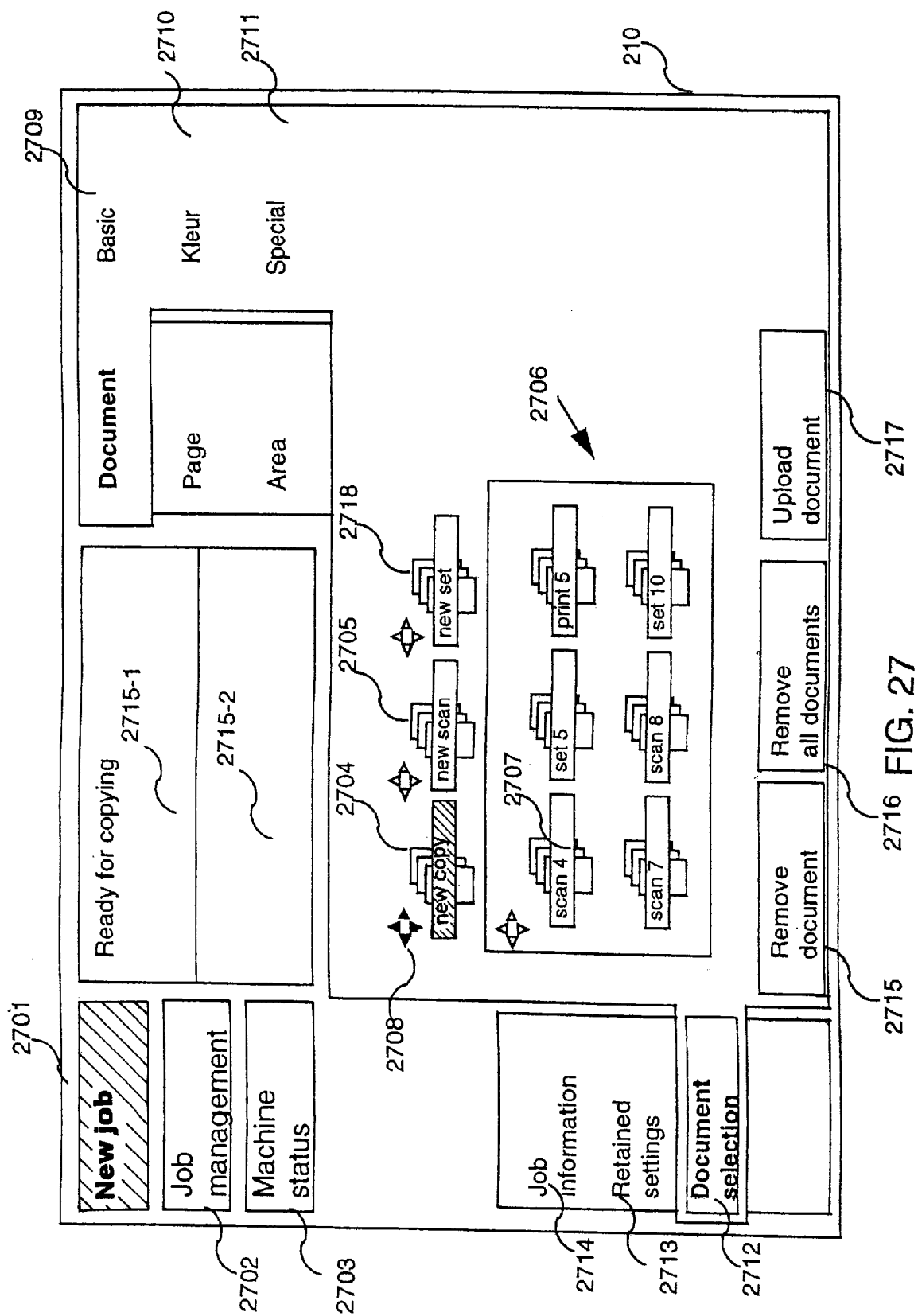
FIG. 27 shows an embodiment of the standard start-up screen according to a second embodiment of the invention.

FIG. 27 illustrates another embodiment of the operation. Here the user can select formulation of a new job 2701 or execution of processing of an existing job 2702. The term "job" in this context denotes a document with corresponding instructions for finishing. Existing jobs can then be jobs defined in an earlier stage or downloaded print jobs which are stored in the memory means of the reproduction device. In the case of a new job 2701 however, the user must indicate on the basis of which document he wishes to define it. Here the user has the choice of a document obtained by making a copy (new copy 2704), making just a scan (new scan 2718), collating one or more pages already stored (new set 2705) or selecting a document 2707 from a list 2706 of documents already stored. The selection of the source of a document can be carried out with the key cluster 241, the actual selection being displayed by increased contrast of a corresponding key cluster symbol 2708.

If one of the basic 2709, color 2710 or special 2711 groups is then selected, the display screen 210 displays the same selection options as described in connection with the first embodiment. Depending on whether new copy 2704, a new scan 2705 or new set 2718 or existing set 2707 is selected respectively, the selection options are displayed which belong respectively to the copying, scanning and printing modes described in the first embodiment respectively. Once the source of a new job, such as copying, scanning, printing, and so on has been formulated, a selection of a page of a document or of an area of a selected page is carried out in the same way as described in the first embodiment. As described, for example, in FIGS. 10 and 14 for the copying mode and in FIGS. 22 and 24 for the printing mode. What does differ from the first embodiment is that the mode is not selectable or displayed in the manner described in the first embodiment. Instead of the areas 214, 215, 216 shown in FIG. 2 and reserved for the purpose in the first embodiment, in the second embodiment these areas are replaced by the areas 2701, 2702 and 2703 shown in FIG. 27. In this connection it should be noted that the mode in which the reproduction device is operating is also displayed, in both embodiments, in a message area 217 and 2715 respectively shown in FIGS. 2 and 27, by the message that the reproduction device is finished, ready or engaged either in copying, scanning or printing. In this connection it is also possible that the second message areas 217 and 2715 shown in the figures may display a second message indicating that, for example, the reproduction device is busy printing a specific document and is ready to scan a new document. As a result the display screen reflects the situation that the reproduction device can be busy with various tasks independent of one another.

The selection option for selecting the source of a document for formulation of a new job is selected by activating the area shown in FIG. 27, document selection 2712. The associated screen 210 is shown in FIG. 27.

In addition, other displays of the screen 210 not shown in the drawings can be selected for other job-related information. For example, a screen for selecting settings for a new job to be formulated can be called up at retained settings 2713. This can involve specific settings for copying, scanning or print jobs or a choice from a number of sets of settings for copy jobs only.

A screen can also be displayed for retaining or displaying supplementary information relating to an job at job information 2714.

Documents can be respectively removed or sent to an external machine by the following functions respectively of remove document 2715, remove all documents 2716 and upload document 2717.

An overview relating to the status of the reproduction device can also be displayed at machine status 2703. This will involve the stock of copy sheets in the cassette, the quantity of toner or ink still present, the amount of memory space available for the storage of electrical image signals, and the like.

Figure 28:
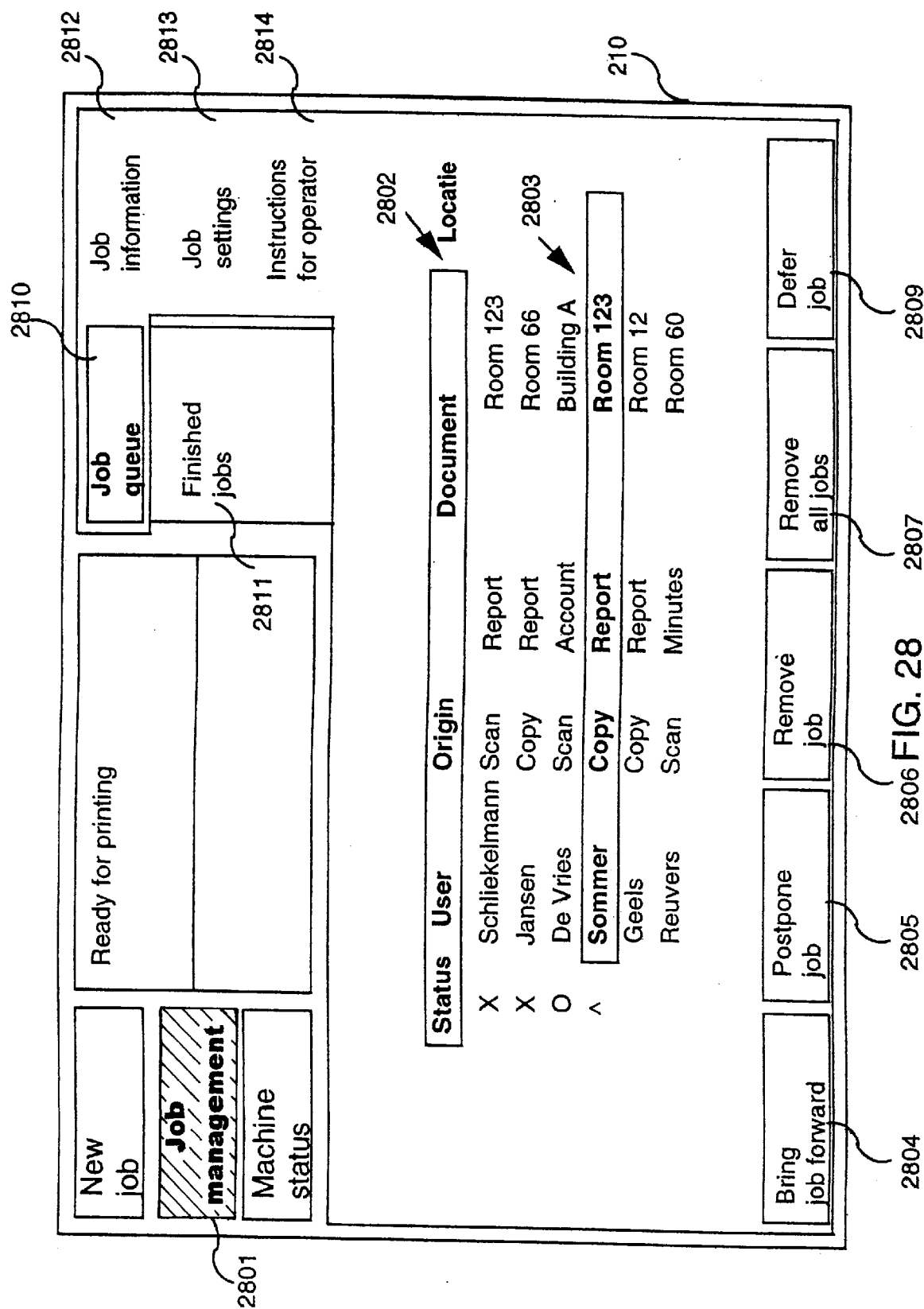
FIG. 28 shows a selection screen for selection of a job for printing according to the second embodiment of the invention.

Finally, FIG. 28 shows the display screen 210 as obtained on selection of management of existing jobs at job management 2801. A list 2802 of jobs 2803 is displayed from which an job can be selected by means of the key cluster 241. This list can be amended by means of the functions 2804 to 2809. There is a very considerable analogy here with the screen of the first embodiment as shown in FIG. 18. The difference from the first embodiment, however, is that in the second embodiment the choice of screen for selection of a document is no longer displayed on selection of settings for a document. In the second embodiment, for a different document it is first necessary to choose the document in accordance with the basic selection screen displayed in FIG. 27.

It is possible to select a list of jobs awaiting execution (job queue 2810) or a list of jobs that have already been finished (finished jobs 2811). In addition, a screen can be selected for displaying information concerning a selected job at job information 2812, a screen for displaying the selected settings and functions for a selected job at job settings 2813 or a screen with supplementary instructions for the user relating to a selected job at instructions for user 2814.

If the screen 210 is suitable for displaying different colors, it is advantageous to show the selected mode in both embodiments by allocating the corresponding screens a color palette characteristic of the selected mode. For example, green tints for the copying mode, brown tints for the scanning mode and blue tints for the printing mode.

Figure 29:
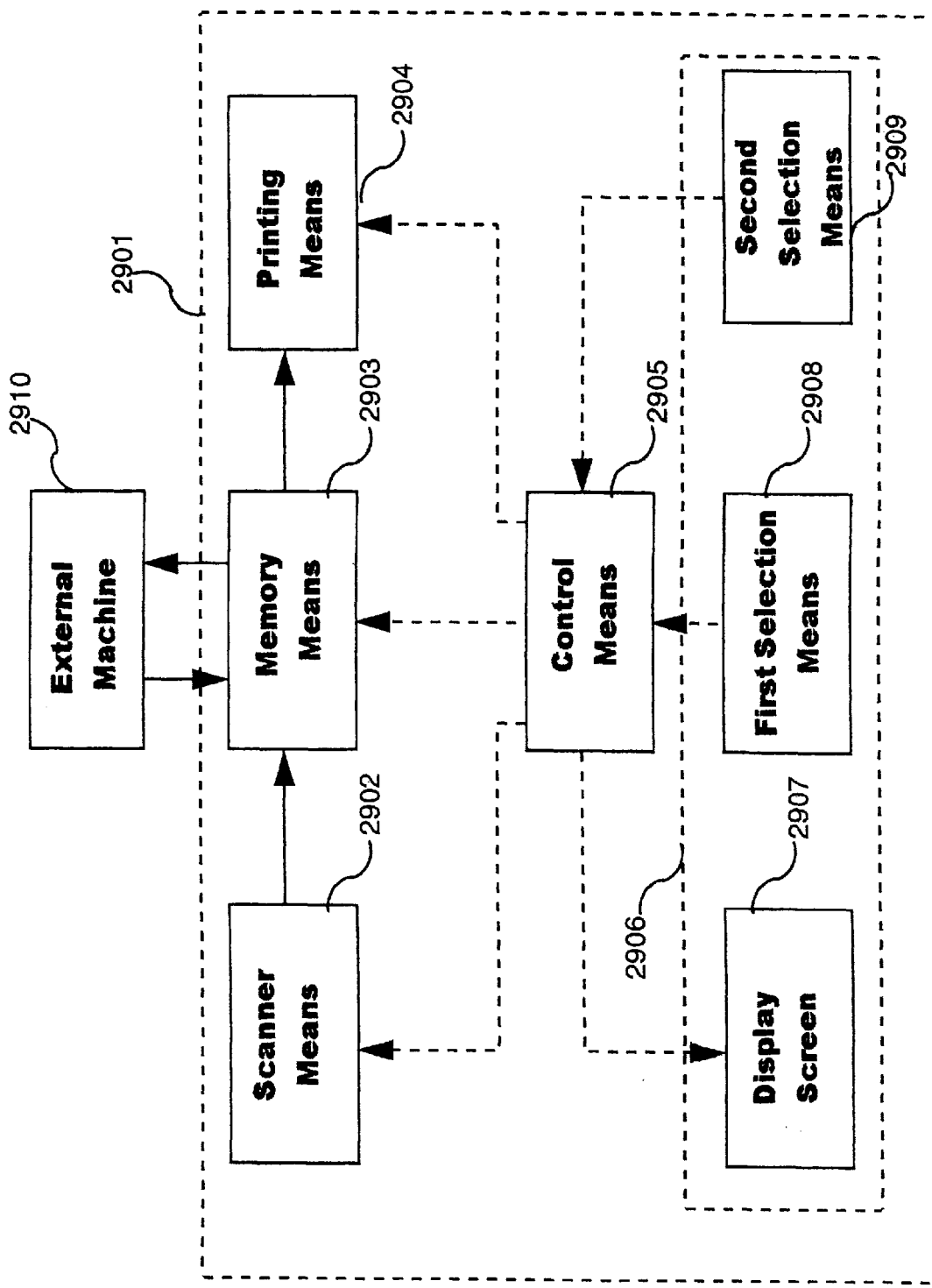
FIG. 29 is a diagram of a reproduction apparatus according to the invention.

Finally, FIG. 29 diagrammatically illustrates a reproduction device 2901 according to the invention. The reproduction device 2901 comprises scanner means 2902 suitable for scanning photoelectrically document sheets fed to the scanner. The resulting electrical image signals are stored in memory means 2903 or can be fed to an external machine 2910. The electrical image signals stored in the memory means 2903, or the electrical image signals originating from an external device 2910, can then be fed to printing means 2904 for printing the same on document sheets.

The scanner means 2902, the memory means 2903 and the printing means 2904, like the operating means 2906, are controlled by control means 2905. The operating means 2906 comprise a display screen 2907, first selection means 2908 and second selection means 2909. The selection means 2908 and 2909 to be operated by a user generate first and second operating signals to be fed to the control means 2905. From the first and second operating signals fed to the control means 2905 the latter generate control signals for application to the scanner means 2902, the memory means 2903, the printing means 2904 and the display screen 2907. The display screen 2907 is suitable for displaying, on the basis of the control signals fed thereto, the settings and functions selected by the selection means 2908 and 2909.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reproduction device comprising:
   scanner means for photoelectrically converting image information of a document sheet to electrical image information;
   memory means for storing electrical image information;
   printer means for printing electrical image information on a document sheet;
   control means for controlling the reproduction device by control signals; and
   user interface means for generating operating signals to be fed to the control means, the user interface means including;
      a display screen for displaying groups of apparatus functions for selection,
      first selection means for selecting a group of apparatus functions to be displayed on the display screen, by generating first operating signals to be fed to the control means, and
      second selection means for selecting an apparatus function displayed on the display screen and for generating second operating signals corresponding thereto and for feeding the second operating signals to the control means;
   the groups of apparatus functions including;
      a first group with document apparatus functions relating to all document sheets of a document,
      a second group with document sheet apparatus functions relating to a specific document sheet, and
      a third group with document area apparatus functions relating to a specific area of a specific document sheet;
   the first selection means selecting the display on the display screen, from a standard menu displayed on the display screen, by respective document, page or area selection signals, the display on the display screen selected by the first selection means being of at least some of the selectable functions of either the first, second or third groups of apparatus functions.

2. The reproduction device according to claim 1, wherein the control means comprises signalling means for indicating whether the first, second or third group of apparatus functions has been selected by the document, page and area selection signals.

3. The reproduction device according to claim 2, wherein the first selection means selects, from a standard screen displayed on the display screen, by respective basic, printing quality and speciality selection signals, the display on the display screen of at least some of the selectable apparatus functions relating respectively to basic functions, print quality functions and special functions.

4. The reproduction device according to claim 3, wherein the operating means comprises signalling means for indicating whether either the basic, print quality or speciality functions have been selected by the basic, print quality and speciality selection signals.

5. The reproduction device according to claim 4, wherein the first selection means selects from a standard screen displayed on the display screen, by means of respective copying, scanner and print selection signals, the display on the display screen of apparatus functions relating to respective copying, scanning or printing.

6. The reproduction device according to claim 5, wherein the control means comprises signalling means for indicating whether apparatus functions relating to either copying, scanning or printing have been selected by the copy, scanner or print selection signals.

7. The reproduction device according to claim 6, wherein the first selection means selects from a standard screen displayed on the display screen, by respective new-job or existing-job selection signals, the display on the display screen of apparatus functions relating to defining or changing a new or existing copying, scanning or printing job, respectively.

8. The reproduction device according to claim 6, wherein the control means comprises signalling means for indicating whether apparatus functions relating to either defining a new job or changing an existing job have been selected by new-job or existing-job selection signals.

9. The reproduction device according to claim 8, wherein the first selection means are keys disposed near the display screen, and wherein the signalling means are each a separately controllable signalling area displayed on the display screen and corresponding to a key, the area indicating whether a selection corresponding to the signalling area has been selected by the corresponding key.

10. The reproduction device according to claim 1, wherein the first selection means selects from a standard screen displayed on the display screen, by means of respective copying, scanner and print selection signals, the display on the display screen of apparatus functions relating to respective copying, scanning or printing.

11. The reproduction device according to claim 10, wherein the control means comprises signalling means for indicating whether apparatus functions relating to either copying, scanning or printing have been selected by the copy, scanner or print selection signals.

12. The reproduction device according to claim 11, wherein the first selection means selects from a standard screen displayed on the display screen, by respective new-job or existing-job selection signals, the display on the display screen of apparatus functions relating to defining or changing a new or existing copying, scanning or printing job, respectively.

13. The reproduction device according to claim 11, wherein the control means comprises signalling means for indicating whether apparatus functions relating to either defining a new job or changing an existing job have been selected by new-job or existing-job selection signals.

14. The reproduction device according to claim 13, wherein the first selection means are keys disposed near the display screen, and wherein the signalling means are each a separately controllable signalling area displayed on the display screen and corresponding to a key, the area indicating whether a selection corresponding to the signalling area has been selected by the corresponding key.

15. The reproduction device according to claim 1, wherein the first selection means selects from a standard screen displayed on the display screen, by respective new-job or existing-job selection signals, the display on the display screen of apparatus functions relating to defining or changing a new or existing copying, scanning or printing job, respectively.

16. The reproduction device according to claim 1, wherein the first selection means are keys disposed near the display screen, and wherein the signalling means are each a separately controllable signalling area displayed on the display screen and corresponding to a key, the area indicating whether a selection corresponding to the signalling area has been selected by the corresponding key.

17. The reproduction device according to claim 2, wherein the first selection means are keys disposed near the display screen, and wherein the signalling means are each a separately controllable signalling area displayed on the display screen and corresponding to a key, the area indicating whether a selection corresponding to the signalling area has been selected by the corresponding key.

18. The reproduction device according to claim 3, wherein the first selection means are keys disposed near the display screen, and wherein the signalling means are each a separately controllable signalling area displayed on the display screen and corresponding to a key, the area indicating whether a selection corresponding to the signalling area has been selected by the corresponding key.

19. The reproduction device according to claim 4, wherein the first selection means are keys disposed near the display screen, and wherein the signalling means are each a separately controllable signalling area displayed on the display screen and corresponding to a key, the area indicating whether a selection corresponding to the signalling area has been selected by the corresponding key.

20. The reproduction device according to claim 5, wherein the first selection means are keys disposed near the display screen, and wherein the signalling means are each a separately controllable signalling area displayed on the display screen and corresponding to a key, the area indicating whether a selection corresponding to the signalling area has been selected by the corresponding key.

* * * * *